(12) United States Patent
Takayanagi

(10) Patent No.: US 10,589,782 B2
(45) Date of Patent: Mar. 17, 2020

(54) POWER STEERING APPARATUS

(71) Applicant: HITACHI AUTOMOTIVE SYSTEMS, LTD., Hitachinaka-shi, Ibaraki (JP)

(72) Inventor: Naoki Takayanagi, Machida (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 299 days.

(21) Appl. No.: 15/546,779

(22) PCT Filed: Jan. 13, 2016

(86) PCT No.: PCT/JP2016/050828
§ 371 (c)(1),
(2) Date: Jul. 27, 2017

(87) PCT Pub. No.: WO2016/132776
PCT Pub. Date: Aug. 25, 2016

(65) Prior Publication Data
US 2018/0009476 A1    Jan. 11, 2018

(30) Foreign Application Priority Data
Feb. 18, 2015  (JP) ................................. 2015-029193

(51) Int. Cl.
*B62D 15/02*      (2006.01)
*G01D 5/14*       (2006.01)
(Continued)

(52) U.S. Cl.
CPC ........... *B62D 15/0225* (2013.01); *B62D 3/02* (2013.01); *B62D 5/0463* (2013.01); *B62D 6/00* (2013.01); *G01D 5/145* (2013.01)

(58) Field of Classification Search
CPC .... B62D 15/0225; B62D 3/02; B62D 5/0463; B62D 6/00; G01D 5/145
See application file for complete search history.

(56) References Cited

U.S. PATENT DOCUMENTS 8,868,297 B2 * 10/2014 Yoshitake ............ B62D 5/0493
                                                180/412
8,924,083 B2 * 12/2014 Yoshitake ............. B62D 5/049
                                                180/412

FOREIGN PATENT DOCUMENTS

JP      S63-078754 U1    5/1988
JP      2011-252840 A    12/2011
(Continued)

*Primary Examiner* — Kevin Hurley
*Assistant Examiner* — Michael R Stabley
(74) *Attorney, Agent, or Firm* — Foley & Lardner LLP

(57) ABSTRACT

A power steering apparatus includes: a first detection element arranged to sense a rotation angle of the first gear based on a variation of a magnetic field generated by the first magnetic member; a second detection element arranged to sense a rotation angle of the second gear based on a variation of a magnetic field generated by the second magnetic member; an absolute steering angle calculating circuit configured to calculate an absolute steering angle of the steering wheel from an neutral position of the steering wheel at which the steered wheel directs in a straight direction, by a combination between the rotation angle of the first gear and the rotation angle of the second gear; and a control section configured to drive and control the electric motor based on the absolute steering angle.

20 Claims, 11 Drawing Sheets

(51) Int. Cl.
*B62D 3/02* (2006.01)
*B62D 5/04* (2006.01)
*B62D 6/00* (2006.01)

(56) References Cited

FOREIGN PATENT DOCUMENTS

JP  2013-156184 A  8/2013
JP  2014-019264 A  2/2014

* cited by examiner

POWER STEERING APPARATUS

TECHNICAL FIELD

This invention relates to a power steering apparatus which is mounted on a vehicle and so on, and which includes a steering angle sensor arranged to sense a steering angle of a steering wheel.

BACKGROUND ART

There is known a device described in a following patent document 1, as a conventional power steering apparatus.

The power steering apparatus includes a steering mechanism arranged to steer a steered wheel in accordance with an operation of a steering wheel, and an electric motor arranged to provide a steering force to the steering mechanism.

Moreover, the power steering apparatus includes a steering angle sensor arranged to sense a steering angle of the steering wheel. The control and so on of the motor is performed based on the steering angle.

The steering angle sensor includes a first gear which includes a magnetic member, and which is arranged to be rotated in accordance with the rotation of the steering wheel, and a second gear which includes a magnetic member, which is engaged with the first gear to be rotated, and whose a number of teeth is different from that of the first gear.

The steering angle sensor includes two detection elements arranged to sense rotation angles (first and second rotation angles) of the first and second gears from variations of magnetic fields of the magnetic members. The steering angle sensor is arranged to sense the steering angle (absolute steering angle) which is a rotation amount from a neutral position of the steering wheel, based on an angle different of the first and second rotation angles.

By the way, in the conventional power steering apparatus, the gears are easily (carelessly) assembled to the steering angle sensor without consideration of the rotation angles.

In this case, the absolute steering angle outputted from the steering angle sensor may be deviated from the steering angle (actual steering angle) of the steering wheel by a predetermined angle. The steering angle sensor is arranged to calibrate this deviation of the angle so that the absolute steering angle corresponds to the actual steering angle.

However, the absolute steering angle sensed by the above-described method is based on the calibration. Accordingly, for example, in a case where it is not possible to refer to a correction value due to failure (malfunction) of a nonvolatile storage and so on which stores the correction value for the calibration, the absolute steering angle is calculated based on the angle difference of the uncorrected rotation angles. Accordingly, a different between the absolute steering angle and the actual steering angle may be generated.

PRIOR ART DOCUMENT

Patent Document

Patent Document 1: Japanese Patent Application Publication No. 2014-19264

SUMMARY OF THE INVENTION

It is, therefore, an object of the present invention to provide a power steering apparatus devised to solve the above-described problems, and to continue an operation of a steering wheel without providing a steering unnatural feeling by assembling first and second gears to a steering angle sensor to decrease a different between a steering angle and an actual steering angle, even when a malfunction is generated in a calibration value for correcting an output value of the steering sensor.

In the present invention, a power steering apparatus comprises: a steering mechanism arranged to steer a steered wheel in accordance with an operation of a steering wheel; an electric motor arranged to provide a steering force to the steering mechanism; a sensor housing provided to the steering mechanism, and including a first gear supporting portion and a second gear supporting portion which are formed within the sensor housing; a first gear which is rotatably held on the first gear supporting portion, which includes a plurality of first tooth portions integrally formed on an outer circumference side, and a first magnetic member in which an N pole and an S pole are magnetized around a rotation axis that is a center, and which is arranged to be rotated in accordance with a rotation of the steering wheel; a first mark portion which is provided to the first gear, and which is indicative of a position of one of the N pole and the S pole that are magnetized in the first magnetic member; a second gear which is rotatably held on the second gear supporting portion, which includes a plurality of second tooth portions integrally formed on an outer circumference side, and arranged to be directly or indirectly engaged with the first tooth portions, which includes a second magnetic member in which an N pole and to an S pole are magnetized around a rotation axis that is a center, and which is arranged to be rotated in accordance with the rotation of the first gear; a second mark portion which is provided to the second gear, which is indicative of a position of one of the N pole and the S pole that are magnetized in the second magnetic member, and which is in a predetermined position relationship with the first mark portion in an initial state where the first gear and the second gear are received on the gear supporting portions; a first detection element arranged to sense a rotation angle of the first gear based on a variation of a magnetic field generated by the first magnetic member; a second detection element arranged to sense a rotation angle of the second gear based on a variation of a magnetic field generated by the second magnetic member; an absolute steering angle calculating circuit configured to calculate an absolute steering angle of the steering wheel from an neutral position of the steering wheel at which the steered wheel directs in a straight direction, by a combination between the rotation angle of the first gear and the rotation angle of the second gear; and a control section configured to drive and control the electric motor based on the absolute steering angle.

By the present invention, even when the malfunction is generated in the calibration value for s correcting the output value of the steering sensor, the difference between the steering angle outputted from the steering angle sensor, and the actual steering angle of the steering wheel is hard to be generated. Accordingly, it is possible to continue the operation of the steering wheel without providing the steering unnatural feeling.

DESCRIPTION OF EMBODIMENTS

Hereinafter, an embodiment of a power steering apparatus according to the present invention is explained in detail with reference to the drawings.

Figure 1:
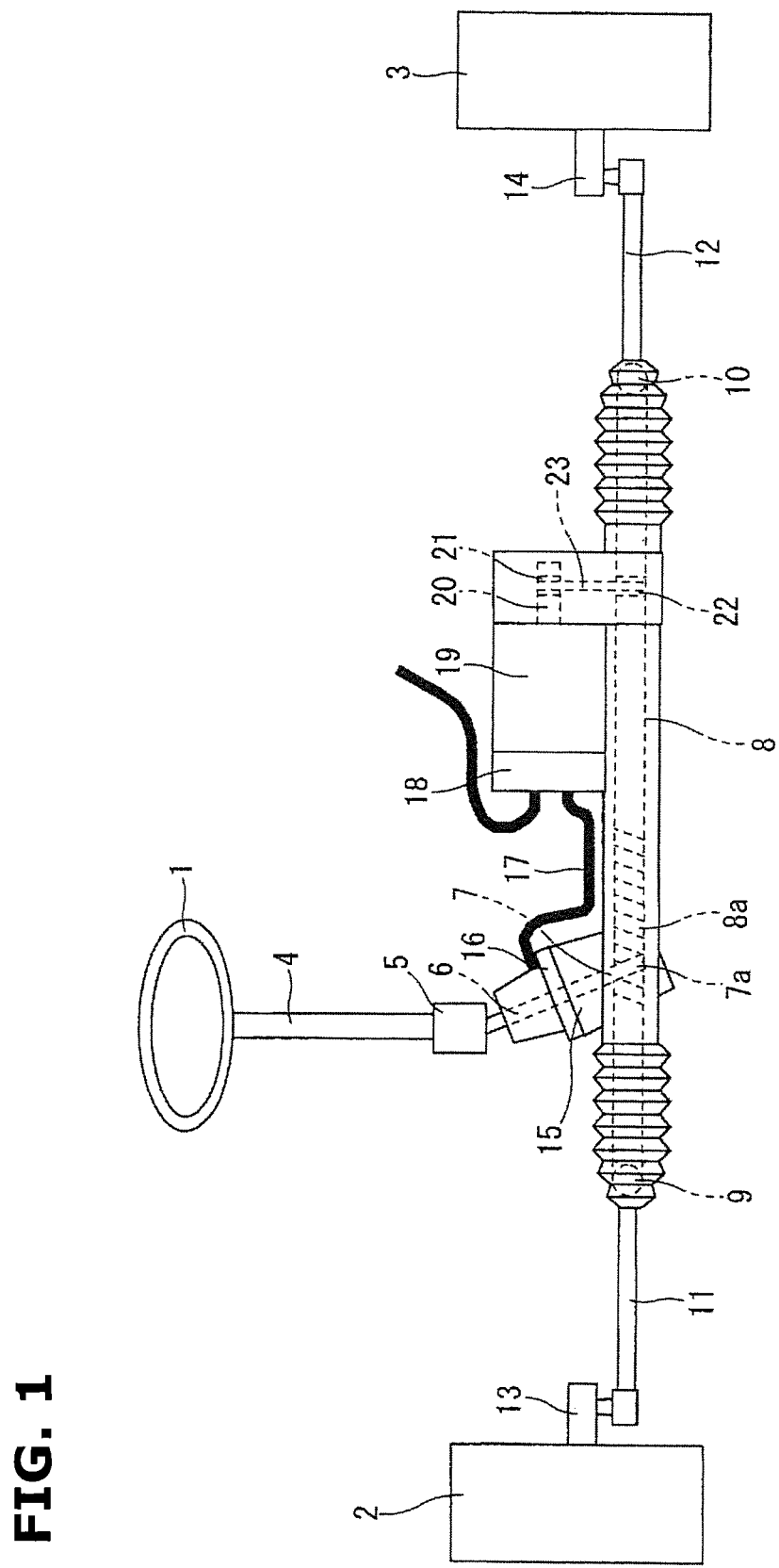
FIG. 1 is a schematic view showing an overall configuration of a power steering apparatus according to an embodiment of the present invention.

In the power steering apparatus according to the present invention, a steering wheel 1 disposed within a vehicle interior is mechanically connected by a steering mechanism to steered wheels 2 and 3 which are front wheels of the vehicle, as shown in FIG. 1.

This steering mechanism includes a steering shaft 6 connected to the steering wheel 1 through an intermediate shaft 4 and a universal coupling (universal joint) 5 to rotate as a unit with the steering wheel 1; a pinion shaft 7 connected though a torsion bar (not shown) to the steering shaft 6 to transmit torque; and a rack bar 8 including a rack 8a which is provided on an outer circumference of the rack bar 8, and which is engaged with a pinion 7a of an outer circumference of the pinion shaft 7. The pinion shaft 7 and the rack bar 8 constitute a steered (turning) mechanism which is constituted by a rack and pinion mechanism.

Both end portions of the rack bar 8 are connected, respectively, through ball joints 9 and 10, tie rods 11 and 12, knuckle arms 13 and 14 and so on to the steered wheels 2 and 3.

By the above-described configuration, when the driver operates to rotate the steering wheel 1, the intermediate shaft 4 and the steering shaft 6 are rotated, respectively, around axes so as to generate the torsion of the torsion bar. By the elastic force of the torsion bar which is generated by the torsion of the torsion bar, the pinion shaft 7 is rotated to follow the steering shaft 6. Then, this rotation motion of the pinion shaft 7 is converted by the rack and pinion mechanism to a linear motion of the rack bar 8 in the axial direction. The knuckle arms 13 and 14 are pulled, respectively, in a vehicle widthwise direction through the ball joints 9 and 10, and the tie rods 11 and 12, so as to steer (turn) the steered wheels 2 and 3.

Moreover, the steering mechanism includes a sensor housing 15 surrounding the steering shaft 6 and the pinion shaft 7. A torque sensor (not shown) and a steering angle sensor 16 are received within the sensor housing 15. The torque sensor is arranged to sense a steering torque generated in the steering shaft 6 by using a relative rotation angle difference between the steering shaft 6 and the pinion shaft 7 by the torsion of the torsion bar. The steering angle sensor 16 is arranged to sense the steering angle of the steering shaft 6. The torque sensor and the steering angle sensor 16 are electrically connected through a sensor harness 17 to an ECU 18 which is a control section.

The ECU 18 is provided adjacent to an electric motor 19. The ECU 18 is configured to store and perform various control processes, and to drivingly control the electric motor 19 based on steering information such as the steering torque and the steering angle, a vehicle speed signal from a vehicle speed sensor provided to the steered wheels 2 and 3, and so on.

The electric motor 19 includes an output shaft 20 having a tip end portion to which a pulley 21 is fixed. This pulley 21 is linked through a belt 23 to a pulley 22 fixed on an outer circumference of the rack bar 8. A ball screw mechanism (speed reduction mechanism) (not shown) is disposed between the pulley 22 and the rack bar 8. The ball screw mechanism is arranged to reduce a speed of the rotation of the motor 19, and to convert this speed-reduced rotation to the linear motion of the rack bar 8.

Figure 2:
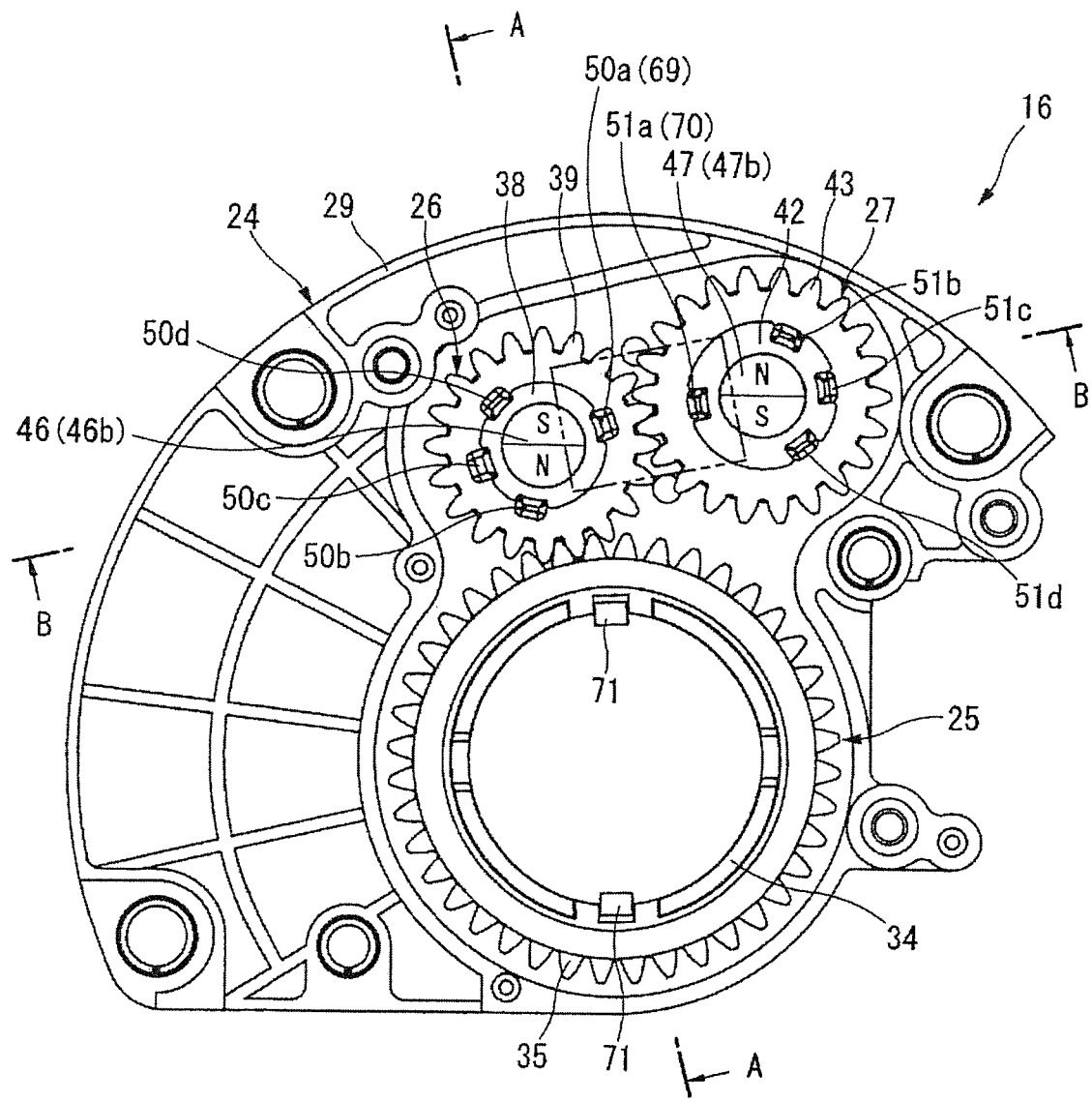
FIG. 2 is a plan view showing a state where a circuit board and a cover portion of a steering angle sensor are detached, in the embodiment.
Figure 3:
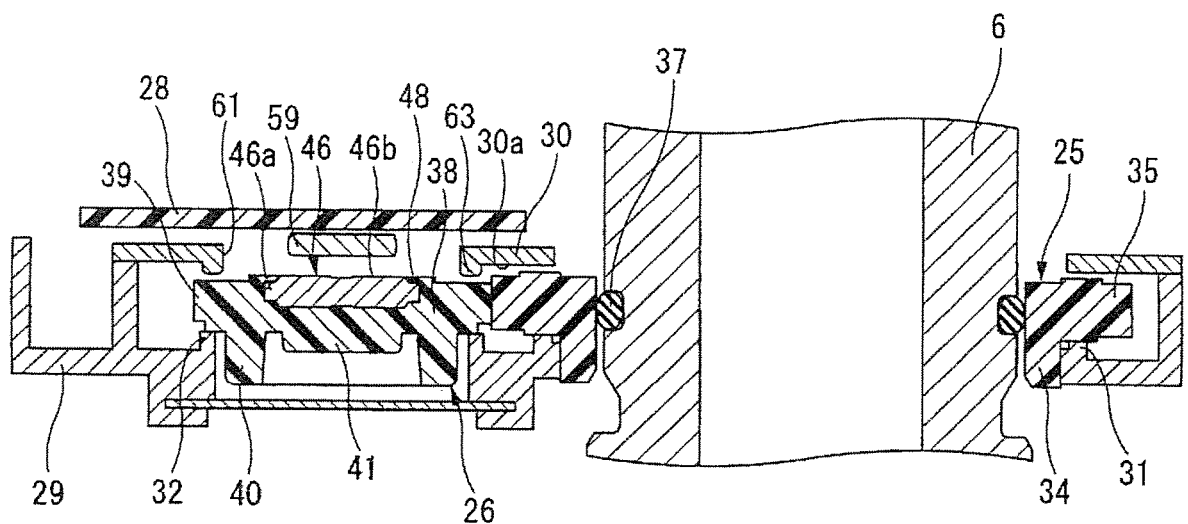
FIG. 3 is a sectional view taken along an A-A line of FIG. 2 in a state where the circuit board and the cover portion are attached.
Figure 4:
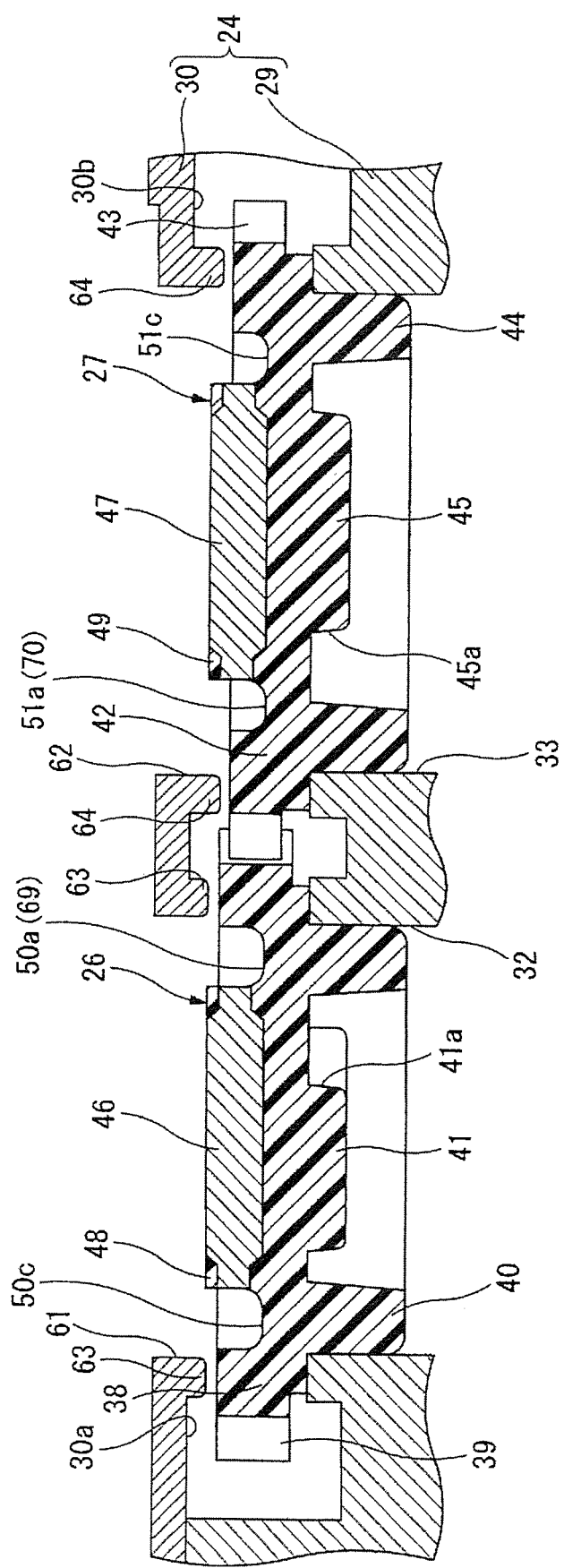
FIG. 4 is a sectional view taken along a B-B line of FIG. 2 in a state where the only cover portion is attached.

As shown in FIG. 2 to FIG. 4, the steering angle sensor 16 includes a case 24 constituting a part of the sensor housing 15; a main gear 25 (a third gear in the present invention) connected to the steering shaft 6 to rotate as a unit with the steering shaft 6; a first detection gear 26 (a first gear in the present invention) engaged with the main gear 25; a second detection gear 27 (a second gear in the present invention) engaged with the first detection gear 26; and a circuit board 28 disposed on upper sides of the detection gears 26 and 27 outside the case 24.

As shown in FIG. 3 and FIG. 4, the case 24 includes a case main body 29 which has a bottomed cylindrical shape, and which receives the gears 25 to 27; and a cover portion 30 which is joined to the case main body 29 through a plurality of bolts (not shown) to close an upper end opening of the case main body 29.

The case main body 29 includes a main gear supporting portion 31, a first detection gear supporting portion 32, and a second detection gear supporting portion 33 each of which has a cylindrical shape, which are formed on a bottom surface of the case main body 29 to protrude in the axial direction, which position the gears 25 to 27, and on which the gear 25 to 27 are rotatably supported and mounted.

Each of the supporting portions 31 to 33 includes a tip end surface having a planar shape perpendicular to the axial direction of the steering shaft 6, so as to support one of the gears 25 to 27 in a posture parallel to the steering shaft 6.

The cover portion 30 is formed into a flat plate shape. The cover portion 30 includes first and second confronting surfaces 30a and 30b which are formed on a lower surface of the cover portion 30, and which confront the first and second detection gears 26 and 27 in the axial direction.

As shown in FIG. 2 and FIG. 3, the main gear 25 is integrally molded by the synthetic resin material for the weight reduction, the reduction of the engagement noise, and so on. The main gear 25 includes a base portion 34 which has a cylindrical shape, and tooth portions 35 (tooth portions in the present invention) formed on an outer circumference side of the base portion 34.

As shown in FIG. 3, the base portion 34 has an inside diameter slightly greater than an outside diameter of the steering shaft 6. The steering shaft 6 is inserted into the base portion 34 with a minute clearance. An O-ring 36 is disposed between an inner circumference surface of the base portion 34 and an outer circumference surface of the steering shaft 6. The O-ring 36 is an annular circular elastic member.

This O-ring 36 is received and held to be elastically abutted on a bottom surface of an annular ring groove 37 formed on the outer circumference surface of the steering shaft 6. The O-ring 36 includes an outer circumference side elastically abutted on an inner circumference surface of an upper end side of the base portion 34. Accordingly, when the steering shaft 6 is rotated, the main gear 25 is integrally rotated based on a frictional force of the O-ring 36 elastically mounted between the steering shaft 6 and the base portion 34.

The first detection gear 26 is integrally molded from the synthetic resin, similarly to the main gear 25. As shown in FIG. 2 to FIG. 7, the first detection gear 26 includes a base portion 38 which has a disc shape; tooth portions 39 which are first tooth portions, and which are formed on an outer circumference side of the base portion 38, and which are engaged with the tooth portions 35 of the main gear 25; and a cylindrical portion 40 standing from a lower end surface of the base portion 38.

The cylindrical portion 40 is formed coaxially with the base portion 38. The cylindrical portion 40 has an outside diameter smaller than an inside diameter of the first detection gear supporting portion 32. The cylindrical portion 40 is disposed inside the first detection gear supporting portion 32.

Figure 7:
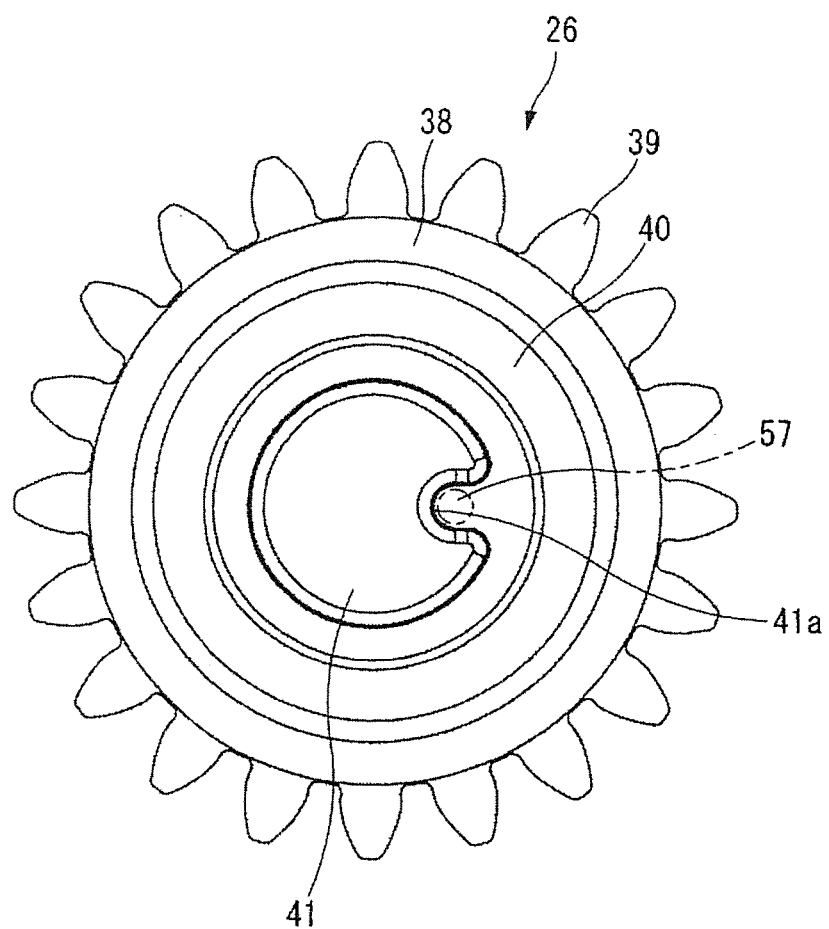
FIG. 7 is a back view showing the first detection gear in the embodiment.

Moreover, a protruding portion 41 having a cylindrical column shape is formed radially inside the cylindrical portion 40 to protrude from a lower end surface of the base portion 38. As shown in FIG. 7, the protruding portion 41 includes a mounting recessed portion 41a formed at a predetermined position in a circumferential direction of the protruding portion 41. The mounting recessed portion 41a has a substantially semi-arc section. The mounting recessed portion 41a serves as a rotation position alignment portion of the gear side when the first detection gear 26 is mounted to a first magnetizing device 52 (described later).

The second detection gear 27 is integrally molded by the synthetic resin, similarly to the main gear 25. As shown in FIG. 2 to FIG. 4 and FIG. 8, the second detection gear 27 includes a base portion 42 which has a disc shape; tooth portions 43 which are second tooth portions, and which are formed on an outer circumference side of the base portion 42, and which are engaged with the tooth portions 35 of the first detection gear 26; and a cylindrical portion 44 standing from a lower end surface of the base portion 42.

The cylindrical portion 44 is formed coaxially with the base portion 42. The cylindrical portion 44 has an outside diameter smaller than an inside diameter of the second detection gear supporting portion 33. The cylindrical portion 44 is disposed inside the second detection gear supporting portion 33.

Figure 8:
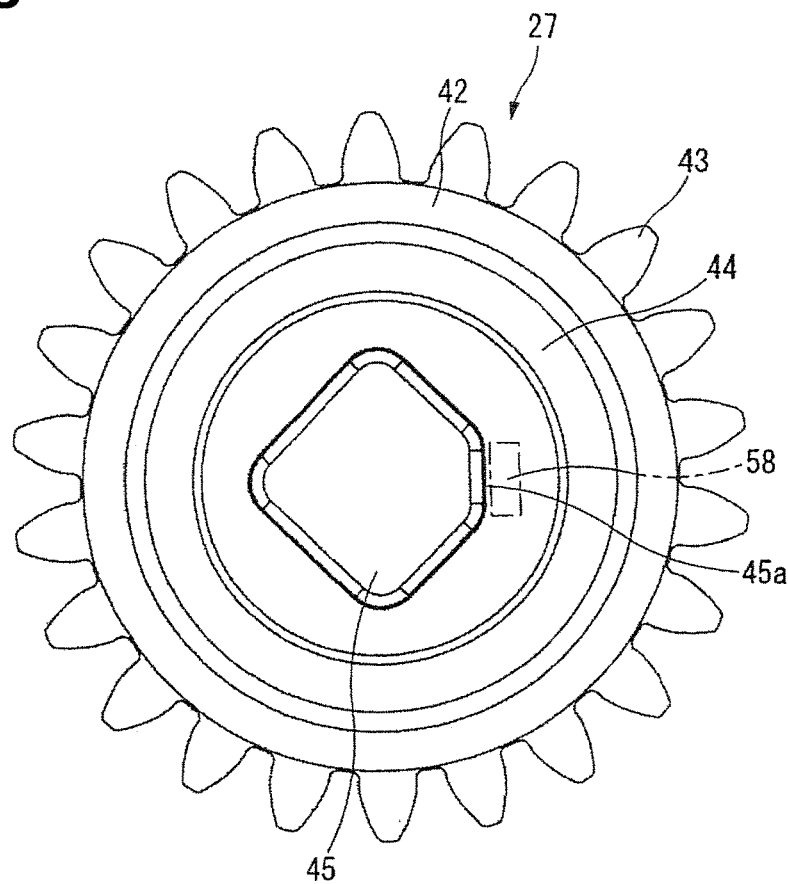
FIG. 8 is a back view showing a second detection gear in the embodiment.

Moreover, a protruding portion 45 having a rectangular column shape is disposed and received radially inside the cylindrical portion 44. The protruding portion 45 protrudes from a lower surface of the base portion 42. As shown in FIG. 8, the protruding portion 45 includes a mounting recessed portion 45a which has a cutout shape, and which is formed at a predetermined position in a circumferential direction of the protruding portion 45. The mounting recessed portion 45a serves as a rotation position alignment portion of the gear side when the second detection gear 27 is mounted to a second magnetizing device described later (not shown).

The first detection gear 26 and the second detection gear 27 have numbers of teeth which do not divisible each other, so as to obtain a predetermined speed reduction ratio. That is, as shown in FIG. 2, a number of the teeth of the tooth portions 39 of the first detection gear 26 is set to 20. On the other hand, a number of the teeth of the tooth portions 43 of the second detection gear 27 is set to 22. With this, the base portion 42 and the cylindrical portion 44 of the second detection gear 27 are formed to have diameters greater than those of the base portion 38 and the cylindrical portion 40 of the first detection gear 26.

Besides, the teeth number of the main gear 25 is set to 40 which is twice (double) the teeth number of the tooth portions 39 of the first detection gear 26.

Figure 9:
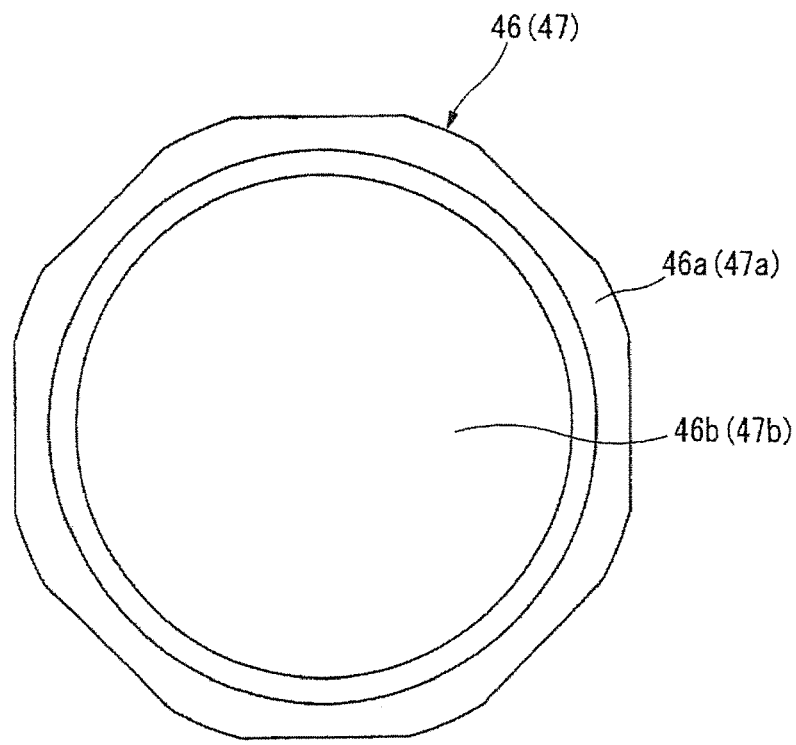
FIG. 9 is a plan view showing a shape of a magnet in the embodiment.
Figure 10:
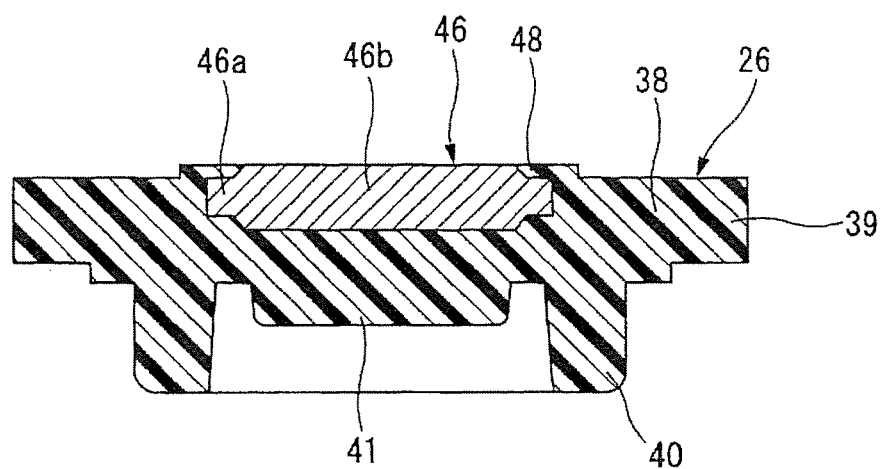
FIG. 10 is a sectional view taken along a sectional line D-D of FIG. 5.

Furthermore, first and second magnets 46 and 47 are provided, respectively, on upper portion sides of the detection gears 26 and 27. The first and second magnets 46 and 47 are first and second magnetic members having circular plate shapes. As shown in FIG. 9, each of the first and second magnets 46 and 47 includes an outer circumference surface having a substantially octagonal shape which is cut in tangent directions, and which is a noncircular shape. The first and second magnets 46 and 47 include outer circumference portions 46a and 47a which have, respectively, thicknesses that are smaller than thicknesses of inner circumference portions 46b and 47b.

Moreover, as shown in FIG. 2 to FIG. 6 and FIG. 10, the magnets 46 and 47 are embedded in the detection gears 26 and 27 so that upper end surfaces of the inner circumference portions 46b and 47b are exposed from upper end surfaces of the base portions 38 and 42. Furthermore, upper end surfaces of the outer circumference portions 46a and 47a are covered with annular protrusions 48 and 49. This is because the injection molding is performed in a state where the magnets 46 and 47 are disposed within cavities of injection molding dies (not shown) at the moldings of the detection gears 26 and 27, that is, an insertion molding is used.

Furthermore, four first to fourth recessed portions 50a to 50d and four first to fourth recessed portions 51a to 51d are formed, respectively, on upper end surfaces of the detection gears 26 and 27 to surround the magnets 46 and 47. The first to fourth recessed portions 50a to 50d and the first to fourth recessed portions 51a to 51d are opened in the axial directions of the gears 26 and 27.

Figure 5:
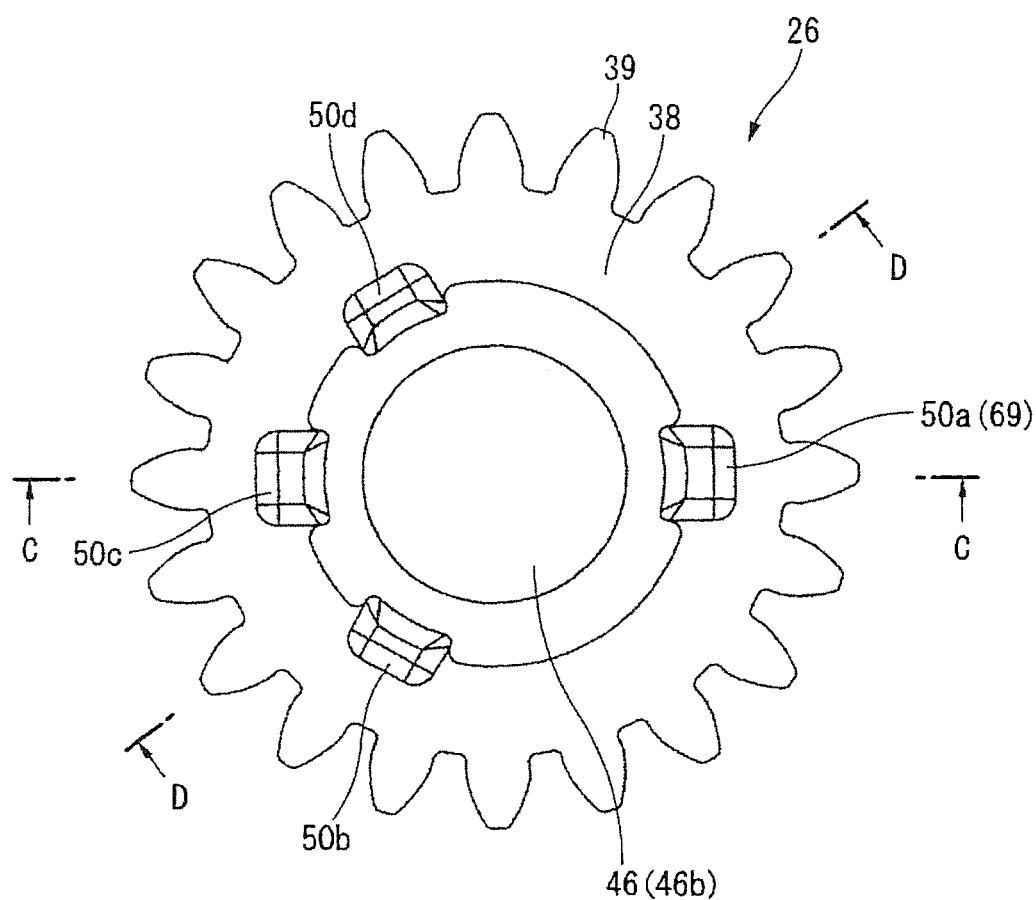
FIG. 5 is a plan view showing a first detection gear in the embodiment.

As shown in FIG. 5, each of the first to fourth recessed portions 50a to 50d is formed into a substantially rectangular shape in a planar view. Each of the first to fourth recessed portions 50a to 50d has a predetermined size which can be sensed by visual observation and by image recognition by a sensor such as a camera. Each of the first to fourth recessed portions 50a to 50d is disposed on the base portion 38 side on an inner circumference side of (radially inside) a tooth bottom of one of the teeth which is nearest to the each of the first to fourth recessed portions 50a to 50d in the tooth portions 39 of the first detection gear.

Moreover, the first recessed portion 50a is disposed on one side of the first detection gear 26 in the radial direction. The second to fourth recessed portions 50b to 50d which are other than the first recessed portion 50a are disposed on the other side of the first detection gear 26 in the radial direction. That is, the only first recessed portion 50a is disposed to be apart from the second to fourth recessed portions 50b to 50d.

Besides, the first to fourth recessed portions 50a to 50d are formed by using four claw portions (not shown) arranged to hold the magnet 46 within the cavity of the insertion molding die at the insertion molding.

That is, each of the claw portions is formed into a rectangular column shape. In each of the claw portions, a middle portion is arranged to grasp the outer circumference surface of the magnet 46 at the insertion molding, in place of a tip end portion of the each of the claw portions. After the injection molding (the insertion molding) is finished, the claw portions are pulled out from the molded first detection gear 26. When the claw portions are pulled out from the first detection gear 26, four claw marks are formed. These four claw marks constitute the first to fourth recessed portions 50a to 50d.

Figure 6:
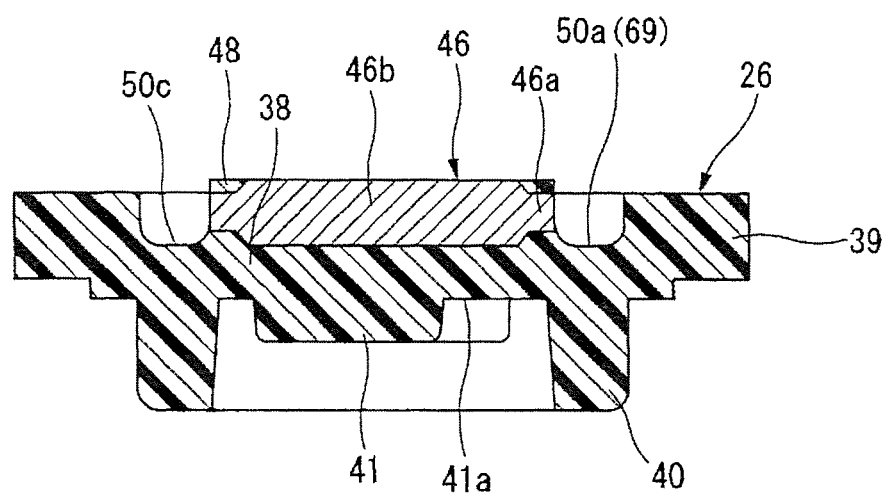
FIG. 6 is a sectional view taken along a sectional line C-C of FIG. 5.

As described above, the middle portions of the claw portions grasp the outer circumference surface of the magnet 46 at the resin molding. Accordingly, as shown in FIG. 3, FIG. 4, and FIG. 6, each of the first to fourth recessed portions 51a to 51d has a depth greater than an axial width of the outer circumference surface of the magnet 46.

The first to fourth recessed portions 51a to 51d formed in the second detection gear 27 has a predetermined size which can be viewed by the visual observation, the camera, the sensor, and so on. Each of the first to fourth recessed portions 51a to 51d is disposed on the base portion 42 side on the inner circumference side of (radially inside) a tooth bottom of one of the teeth which is nearest to the each of the first to fourth recessed portions 51a to 51d in the tooth portions 43 of the second detection gear 27.

Moreover, the first recessed portion 51a is disposed on one side of the second detection gear 27 in the radial direction. The second to fourth recessed portions 51b to 51d which are other than the first recessed portion 51a are disposed on the other side of the second detection gear 27 in the radial direction.

Furthermore, each of the recessed portions 51a to 51d has a depth greater than the axial width of the outer circumference surface of the magnet 47.

Moreover, the magnets 46 and 47 are not magnetized at the above-described insertion molding. The magnets 46 and 47 are magnetized by the magnetizing device after the molding of the detection gears 26 and 27.

Figure 11:
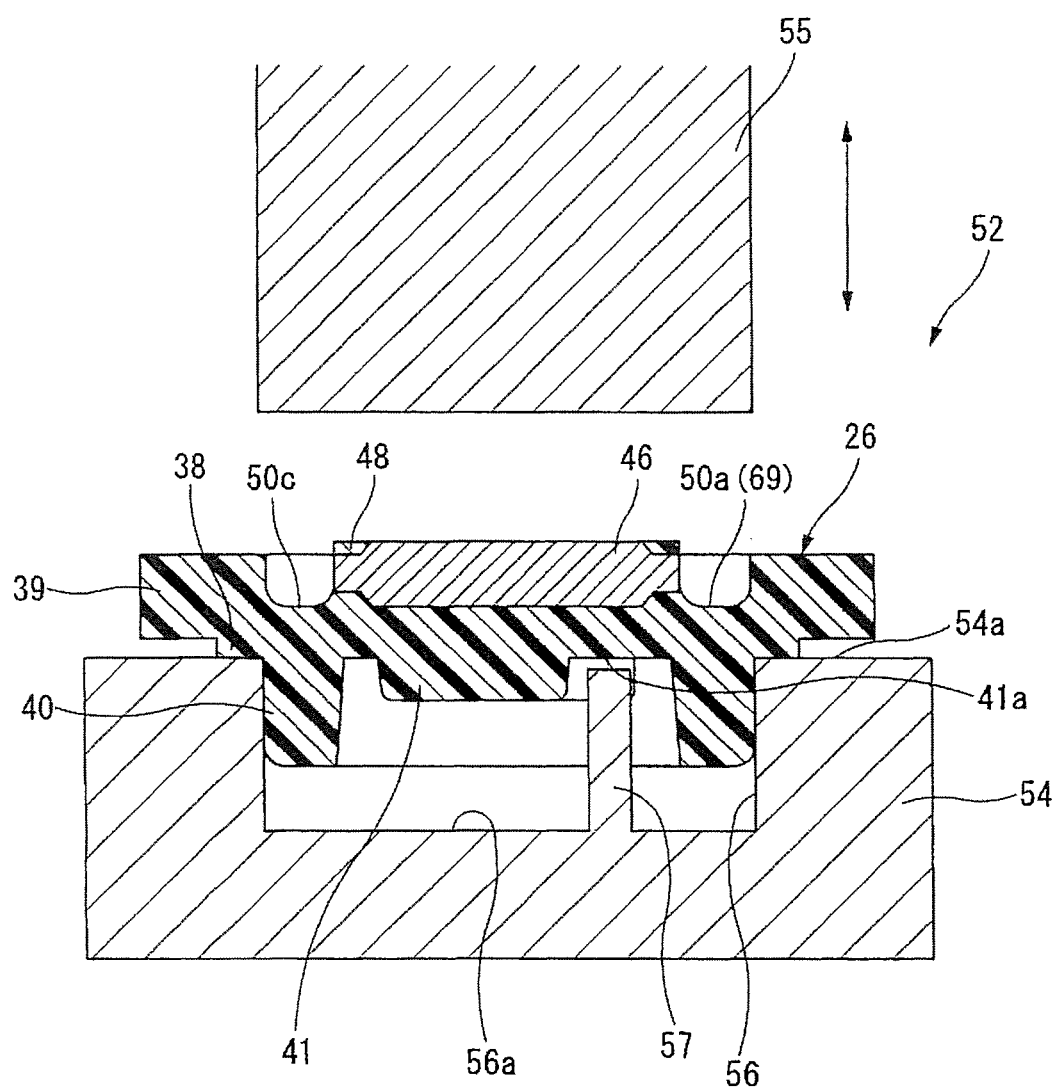
FIG. 11 is a sectional view showing a state where the first detection gear is installed on a magnetizing device.

As shown in FIG. 11, the magnetizing device 52 arranged to magnetize the first magnet 46 of the first detection gear 26 includes a first holding base (support) 54 arranged to hold the first detection gear 26; and a magnetizing coil 55 arranged to magnetize the magnet 46 by a magnetic field generated in the axial direction of the first detection gear 26.

The first holding base 54 includes an upper surface 54a which is positioned at an upper end portion, and which is formed into a flat shape; and a holding hole 56 which has a cylindrical shape, and which is recessed in an inside of the upper end portion. This holding hole 56 has a diameter slightly which is greater than the outside diameter of the cylindrical portion 40 of the first detection gear 26, and which is smaller than the outside diameter of the cylindrical portion 44 of the second detection gear 27. Accordingly, in the first holding base 54, the cylindrical portion 40 of the first detection gear 26 can be inserted into the holding hole 56. On the other hand, the cylindrical portion 44 of the second detection gear 27 cannot be inserted into the holding hole 56.

Moreover, the holding hole 56 has a depth to a bottom surface 56a of the holding hole 56. The depth of the holding hole 56 is greater than a top and bottom width of the cylindrical portion 40 of the first detection gear 26. In a case where an entire of the cylindrical portion 40 is inserted into the holding hole 56 (hereinafter, referred to as a maximum insertion position), the upper surface 54a around the holding hole 56 supports the lower end surface of the base portion 38 of the first detection gear 38, so as to hold the first detection gear 26.

Furthermore, a mounting raised portion 57 is provided on the bottom surface 56a of the holding hole 56 to protrude in the upward direction. The mounting raised portion 57 has a cylindrical shape. The mounting raised portion 57 is a rotation position aligning portion on the first magnetizing device 52 side. As shown by one dot chain line of FIG. 7, this mounting raised portion 57 has a circular cross sectional shape substantially identical to the cross sectional shape of the mounting recessed portion 41a of the first detection gear 26. Moreover, the mounting raised portion 57 is disposed at a position eccentric from the axis of the holding hole 56 by a distance identical to the distance from the axis of the first detection gear 26 to the mounting recessed portion 41a.

As shown in FIG. 11, the mounting raised portion 57 is formed to extend so as to have a predetermined axial length substantially identical to the depth of the holding hole 56. Accordingly, in a case where the relative rotation position of the mounting raised portion 57 is not aligned with the mounting recessed portion 41a, the mounting raised portion 57 is abutted on the lower surface of the protruding portion 41, so that the cylindrical portion 40 cannot be inserted to the maximum insertion position. On the other hand, in a case where the relative rotation position of the mounting raised portion 57 is aligned with the mounting recessed portion 41a, the cylindrical portion 40 can be inserted to the maximum insertion position. That is, the mounting raised portion 57 serves as a rotation position aligning portion on the magnetizing device 52 side, which is arranged to determine the rotation position when the first detection gear 26 is installed (established) on the first holding base 54.

As shown in FIG. 11, the magnetizing coil 55 is formed into a substantially cylindrical shape by a wound wire (not shown). The magnetizing coil 55 is disposed coaxially with the holding hole 56.

The magnetizing coil 55 is arranged to be moved in the axial direction. The magnetizing coil 55 is moved closer to the first detection gear 26 in a state where the first detection gear 26 is held in the holding hole 56, so as to magnetize the exposed upper surface of the inner circumference portion 46b of the magnet 46 (surface (face) magnetization).

Besides, the second magnetizing device arranged to magnetize the second detection gear 27 includes a second holding base arranged to hold the second detection gear 27; and a magnetizing coil 55 arranged to magnetize the magnet 47 by the magnetic field generated in the axial direction of the second detection gear 27, although these are not shown in the drawings.

Hereinafter, the second holding base is explained. Explanations of the configurations identical to those of the first holding base 54 are omitted. Only different points are explained.

In the second holding base, the holding hole has a diameter slightly greater than that of the cylindrical portion 44 of the second detection gear 27, for the installation of the second detection gear 27.

Furthermore, as shown by one dot chain line in FIG. 8, a mounting raised portion 58 protruding from the bottom surface of the holding hole of the second holding base is formed to have a rectangular cross sectional shape to correspond to the shape of the mounting recessed portion 45a of the second detection gear 27. Accordingly, if the first detection gear 26 is attempted to be installed on the second holding base, the first detection gear 26 cannot be installed on the second holding base since the mounting portions have the different shapes. Consequently, it is possible to avoid the wrong (false) installation.

The magnets 46 and 47 are magnetized by the magnetizing coil 55, so that the magnets 46 and 47 have N poles and S poles, as shown in FIG. 2. Besides, in this embodiment, the magnetizing method is the surface (face) magnetization. Accordingly, the S poles are formed on the lower surfaces (on the opposite side in the axial direction) of the region in which the N poles are formed on the upper surfaces of the magnets 46 and 47. The N poles are formed on the lower surfaces of the region in which the S poles are formed on the upper surfaces.

Figure 12:
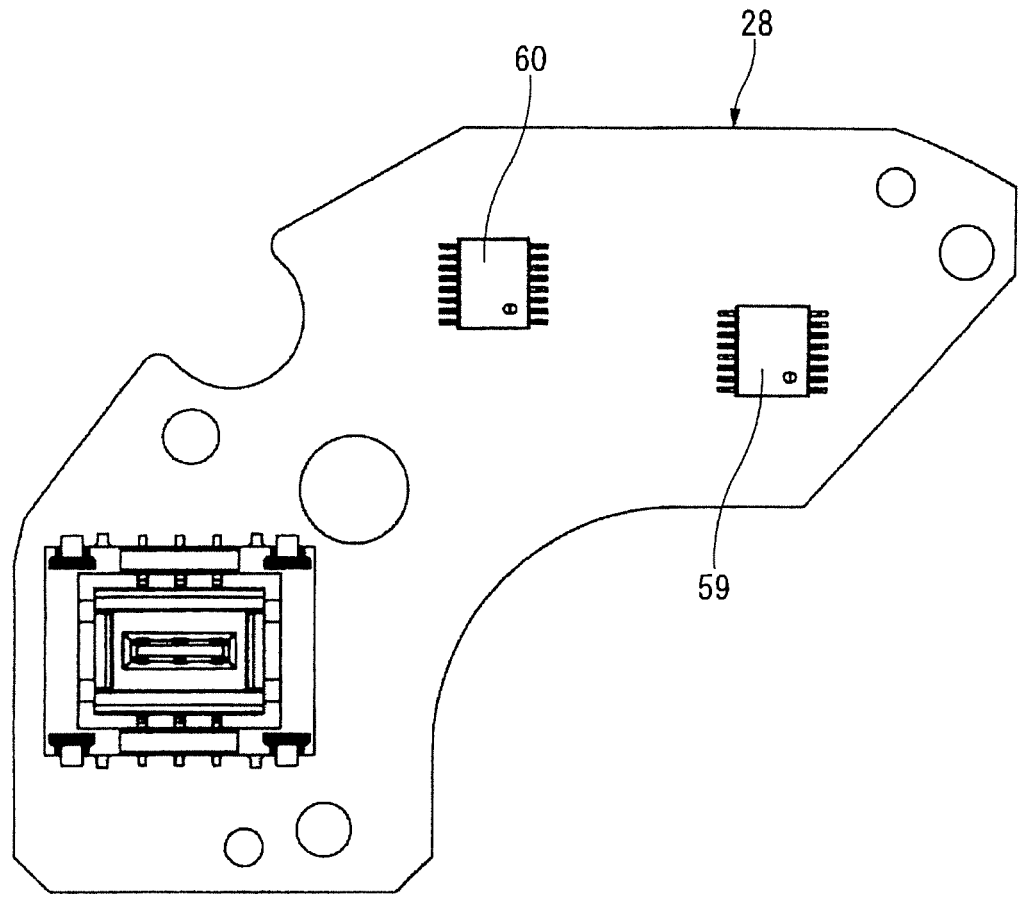
FIG. 12 is a front view showing a lower surface side of the circuit board in the embodiment.

As shown in FIG. 12, the circuit board 28 includes first and second MR elements (magnetic resistance elements, magnetoresistive elements) 59 and 60 which are first and second detection elements (detectors), and which are disposed on a back surface of the circuit board 28 to confront the magnets 46 and 47. These MR elements 59 and 60 are arranged to sense variations of the magnetic fields generated by the confronting magnets 46 and 47, as variations of resistance values of the resistance elements, to thereby sense the first rotation angle and the second rotation angle which are the rotation angles of the corresponding detection gears 26 and 27.

In this case, the cover portion 30 constituting a part of the sensor housing 15 includes two first and second through holes 61 and 62 formed so that the MR elements 59 and 60 provided outside the sensor housing 15 are not interfered with the cover portion 30, as shown in FIG. 3 and FIG. 4.

Furthermore, first and second protruding portions 63 and 64 are formed at hole edges of the through holes 61 and 62 on the detection gears 26 and 27 sides, that is, at predetermined positions of the confronting surfaces 30a and 30b of the cover portion 30. The first and second protruding portions 63 and 64 protrude toward the corresponding detection gears 26 and 27.

The first protruding portion 63 is formed between the tooth portions 35 of the first detection gear 26 and the first recessed portion 50a (a first mark portion 69 described later) in the radial direction of the first detection gear 26. On the other hand, the second protruding portion 64 is formed between the tooth portions 39 of the second detection gear 27 and the first recessed portion 51a (a second mark portion 70 described later) in the radial direction of the second detection gear 27.

Moreover, the first and second protruding portions 63 and 64 extend so that tip end surfaces 63a and 64a are slightly apart from the upper end surfaces of the corresponding detection gears 26 and 27. When the detection gears 26 and 27 are inclined or fallen down, the first and second protruding portions 63 and 64 are abutted on the detection gears 26 and 27.

The first and second rotation angles sensed by the MR elements 59 and 60 are outputted through the sensor harness 17 to a microprocessor 65 provided within the ECU 18.

Figure 13:
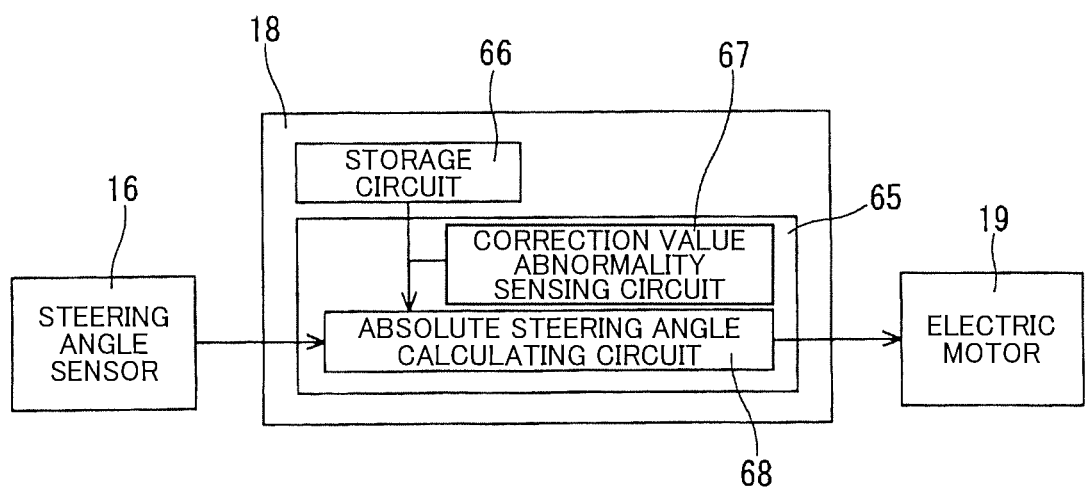
FIG. 13 is a schematic view showing a calculation process of the steering angle by an ECU.

The microprocessor 65 is electrically connected to a nonvolatile storage (not shown). As shown in FIG. 13, the microprocessor 65 is configured to refer to a correction value which is stored in a storage circuit 66 of the nonvolatile storage, and which is for correcting the outputs of the first and second MR elements 59 and 60.

The correction value is for calibrating the output values of the first and second MR elements 59 and 60, that is, the first and second rotation angles, so that the angle difference of the first and second rotation angles becomes 180 degrees when the steering wheel 1 is at the neutral position. The correction value is uniquely determined when the first and second detection gears 26 and 27 are assembled to the steering angle sensor 16.

The microprocessor 65 includes a correction value abnormality sensing circuit 67 configured to sense an abnormality of the correction value; and an absolute steering angle calculating circuit 68 configured to calculate a steering angle (absolute steering angle) of the steering wheel from an neutral position which is a rotation position of the steering wheel 1 when the steered wheels 2 and 3 direct in the straight direction.

The correction value abnormality sensing circuit 67 is configured to sense the abnormality when the correction value is varied, by using the correction value which is uniquely determined, and which is not varied.

The absolute steering angle calculating circuit 68 is configured to refer to the correction value and the first and second rotation angles when the correction value abnormality sensing circuit 67 does not sense the abnormality of the correction value, and to refer only to the first and second rotation angles without referring to the correction value when the correction value abnormality sensing circuit 67 senses the abnormality of the correction value.

The absolute steering angle calculating circuit 68 is configured to calculate the angle difference of the second rotation angle with respect to the first rotation angle, from the referred first and second rotation angles, and to calculate the absolute steering angle based on the angle difference.

Figure 14:
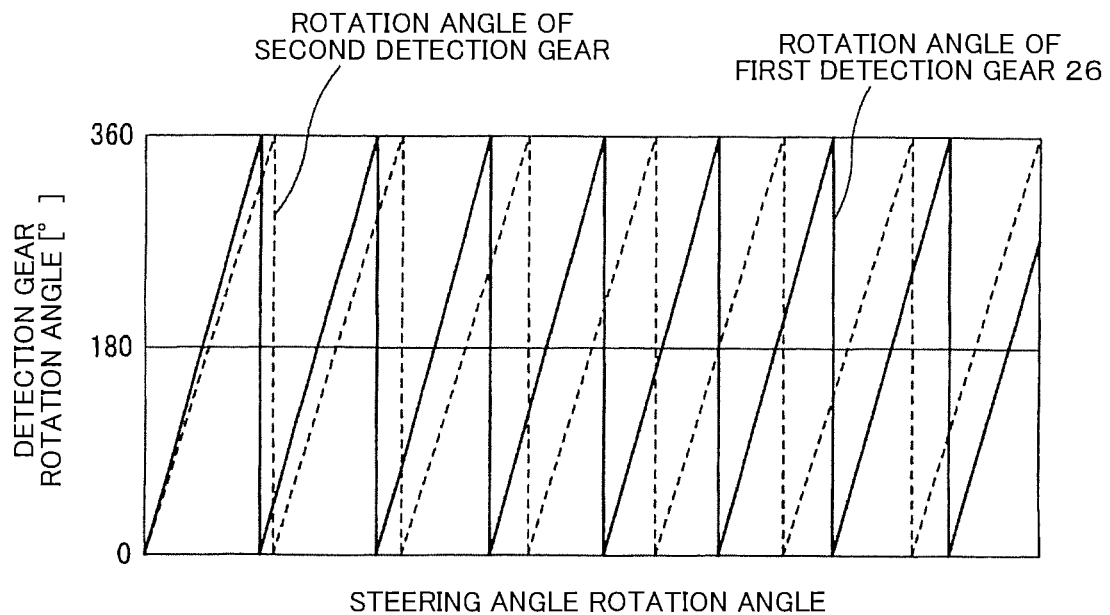
FIG. 14 is a characteristic view showing relationships between a rotation angle of a steering shaft, and first and second rotation angles.
Figure 15:
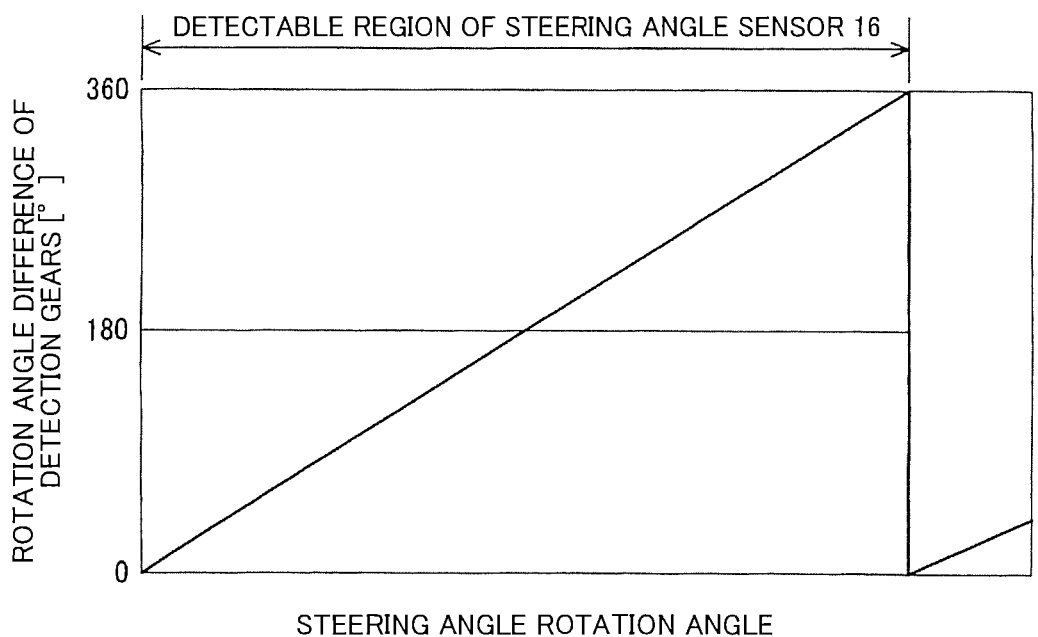
FIG. 15 is a characteristic view showing a relationship between the rotation angle of the steering shaft, and an angle difference between the first and second rotation angles.

As shown in FIG. 14, each of the first and second rotation angles is reset to zero at each one rotation of one of the detection gears 26 and 27. The angle difference between the first rotation angle and the second rotation angle which is generated by the teeth number difference between the detection gears 26 and 27 is constantly set with respect to the rotation angle of the steering angle 6, as shown in FIG. 15. The absolute steering angle calculating circuit 68 is configured to calculate the absolute steering angle from the angle difference by using these constructional characteristics.

In this embodiment, in a case where the correction value is the normal state, the absolute steering angle calculating circuit 68 is configured to judge the neutral position when the corrected angle difference of the first and second rotation angles becomes 180 degrees. On the other hand, in a case where the abnormality is generated in the correction value, the absolute steering angle calculating circuit 68 is configured to judge the neutral position when the uncorrected angle difference of the first and second rotation angles becomes 180 degrees, and to calculate the absolute steering angle based on the variation of the angle difference from the above-state.

The first and second detection gears 26 and 27 include, respectively, first and second mark portions 69 and 70 which are first and second sensed portions that are indicative that the magnetic poles of the magnets 46 and 47 are assembled in a predetermined position relationship.

In this embodiment, the magnetic pole of the magnet 46 and the magnetic pole of the magnet 47 are in the predetermined position relationship by assembling the first detection gear 26 and the second detection gear 27 so that the first recessed portion 50a of the first detection gear 26 and the first recessed portion 51a of the second detection gear 27 confront each other, as shown in FIG. 2.

Moreover, the main gear 25 includes third mark portions 71 and 71 indicative of the rotation position of the steering wheel 1. As shown in FIG. 2, each of the third mark portions 71 and 71 is formed into a recessed shape by cutting a part of the upper end portion of the base portion 34 of the main gear 25 in the axial direction. The third mark portions 71 and 71 are arranged to position a relative angle between the main gear 25 and the steering shaft 6.

Furthermore, the gears 25 to 27 are disposed, respectively, to the gear supporting portions 31 to 33 so that the mark portions 69 to 71 are in a position relationship shown in FIG. 2.

That is, in the main gear 25, the third mark portions 71 and 71 are disposed, respectively, in the upward and downward directions of FIG. 2. Furthermore, in the detection gears 26 and 27, the first and second mark portions 69 and 70 are disposed near each other to confront each other.

[Operation and Effects in this Embodient]

Accordingly, in this power steering apparatus, when the driver pivots the steering wheel 1, the steering angle sensor 16 calculates the steering angle of the steering shaft 6 arranged to rotate as a unit with the steering wheel 1. Then, the ECU 18 drivingly controls the electric motor 19 based on this calculation result, so that the steering assist force according to the actual steering situation is transmitted to the steering mechanism.

In this case, the steering angle sensor 16 calculates the absolute steering angle according to the actual steering angle, based on the first and second rotation angles corrected by the calibration function, as s described above. In this embodiment, even when the abnormality is generated in the calibration function, it is possible to calculate the absolute steering angle near the actual steering angle.

That is, when the abnormality is generated in the correction value, the correction value abnormality sensing circuit 67 senses that abnormality. Accordingly, the absolute steering angle calculating circuit 68 calculates the absolute steering angle based on the uncorrected first and second rotation angles, without referring to the correction value.

In this case, in a case where the absolute steering angle calculating circuit 68 calculates the absolute steering angle near the actual steering angle, the difference between the neutral position indicative of the steering angle sensor 16 and the actual neutral position of the steering wheel 1 is needed to be decreased even when the correction is not performed.

Accordingly, in this embodiment, the first and second detection gears 26 and 27 include, respectively, the first and second mark portions 69 and 70, as described above. Moreover, the first and second detection gears 26 and 27 are disposed so that the first and second mark portions 69 and 70 confront each other in a state where the steering wheel 1 is at the neutral position.

With this, the difference between the actual neutral position of the steering wheel 1 and the neutral position indicative of the steering angle sensor 16 in the state where the calibration is not performed becomes very small. Consequently, the steering sensor 16 can output the absolute steering angle near the actual steering angle even in the state where the correction is not performed.

Accordingly, in this embodiment, even when the malfunction (failure) is generated in the calibration function, it is possible to operate the steering wheel 1 without providing the large unnatural steering feeling to the driver.

Moreover, in this embodiment, the main gear 25 includes the third mark portions 71 and 71 indicative of the neutral position of the steering wheel 1, in addition to the first and second mark portions 69 and 70. The gears 25 to 27 are disposed so that the first to third mark portions 69 to 71 are in the predetermined position relationship.

With this, the difference between the actual steering angle and the absolute steering angle indicative of the steering angle sensor 16 in the state where the calibration is not performed becomes smaller. Accordingly, the driver can continue to operate more safely.

Moreover, in this embodiment, when the correction value abnormality sensing circuit 67 senses the abnormality of the correction value, the absolute steering angle calculating circuit 68 does not refer to the correction value which is the abnormal value, as described above. Consequently, it is possible to suppress that the absolute steering angle calculated by the absolute steering angle calculating circuit 68 becomes the abnormal value, and thereby to ensure the continuation of the safety operation.

Furthermore, in this embodiment, the absolute steering angle is calculated by using the microprocessor 65 in the ECU 18 configured to drivingly control the electric motor 19. Accordingly, it is possible to simplify the device, and to decrease the size of the device, relative to a case in which another microprocessor which is special for the steering angle sensor 16 is provided inside the sensor housing 15 (the case 24).

Moreover, in this embodiment, the magnets 46 and 47 are embedded in the first and second detection gears 26 and 27 by the insertion molding. Then, the magnets 46 and 47 are magnetized by the magnetizing coils 55 and 55. With this, the deviations between the first and second mark portions 69 and 70 and the magnetic poles of the magnets 46 and 47 are hard to be generated, relative to a case in which the previously-magnetized magnets are embedded in the first and second detection gears 26 and 27. Consequently, it is possible to more surely suppress the deviation between the absolute steering angle and the actual steering angle at the assembly operation.

Furthermore, in this embodiment, each of the magnets 46 and 47 is formed into the circular plate shape. Moreover, the magnetizing method of the magnets 46 and 47 are the surface magnetization. With this, the substantially entire of the upper end surfaces of the magnets 46 and 47 which are exposed from the detection gears 26 and 27 are magnetized. Consequently, it is possible to readily sense the detections of the first and second rotation angles by the MR elements 59 and 60.

Moreover, in this embodiment, the recessed portions 50a to 50d and 51a to 51d are formed on the base portion 34 and 38 side on the inner circumference side of the tooth bottom of the tooth which is nearest in the tooth portions 35 and 39 of the detection gears 26 and 27. Accordingly, even when the resin contraction (shrinkage) is generated around the recessed portions 50a to 50d and 51a to 51d when the recessed portion 50a to 50d and 51a to 51d are formed at the resin molding, the contraction is hard to be influenced to the gear portions 35 and 39. With this, it is possible to suppress the deformation of the tooth portions 35 and 39, and the decrease of the strength of the tooth portions 35 and 39 when the first and second mark portions 69 and 70 are formed in the tooth portions 26 and 27.

Moreover, in this embodiment, the cross sectional shapes of the magnets 46 and 47 which are perpendicular to the axial directions of the corresponding gears 26 and 27 are formed into the substantially octagonal shapes which are noncircular shapes. Accordingly, the pivot movements of the magnets 46 and 47 within the detection gears 26 and 27 are restricted.

With this, the deviations between the first and second mark portions 69 and 70 indicative of the magnetic poles, and the actual magnetic poles of the magnets 46 and 47 are hard to be generated. Accordingly, it is possible to more surely suppress the deviation between the actual steering angle and the absolute steering angle at the assembly operation. Moreover, it is possible to suppress the numerical value abnormality and so on of the absolute steering angle according to the pivot movements of the magnets 46 and 47, and thereby to improve the reliability s of the steering angle sensor 16.

Furthermore, in this embodiment, the cover portion 30 includes the protruding portions 63 and 64 extending near the upper end surfaces of the detection gears 26 and 27. Accordingly, it is possible to suppress the inclination and the falling of the gears 26 and 27.

Moreover, the protruding portions 63 and 64 are disposed, respectively, between the mark portions 69 and 70 and the tooth portions 35 and 39 of the corresponding gears 26 and 27. Accordingly, when the inclinations of the gears 26 and 27 are suppressed, the protruding portions 63 and 64 are hard to be interfered with the tooth portions 35 and 39 and the mark portions 69 and 70.

Furthermore, the first and second mark portions 69 and 70 have, respectively, the recessed shapes opened in the axial directions of the gears 26 and 27. Accordingly, it is possible to suppress the interference with the circuit board 28, the cover portion 30 and so on, and the breakage and so on according to the interference, relative to a case in which a mark portion having a raised shape is provided.

Moreover, in this embodiment, the first and second mark portions 69 and 70 are the first recessed portions 50*a* and 51*a* which are the claw marks of the claw portions arranged to sandwiching the magnets 46 and 47 at the insertion molding. Accordingly, it is possible to simplify the device, relative to a case where new first and second mark portions 69 and 70 are formed.

Furthermore, the depths of the first and second mark portions 69 and 70 are greater than the axial widths of the outer circumference surfaces of the magnets 46 and 47. Accordingly, it is possible to largely improve the sensed characteristics of the first and second mark portions 69 and 70. Consequently, it is possible to readily perform the recognition by the visual observation, the camera, and the sensor, and so on. With this, it is possible to improve the operability when the first detection gears 26 and 27 are assembled so that the first and second mark portions 69 and 70 are in the predetermined position relationship.

Moreover, in this embodiment, the relative rotation positions of the first detection gear 26 and the first magnetizing device 52 are aligned with each other at the magnetization of the magnet 46 by mounting the mounting recessed portion 41*a* of the first detection gear 26 and the mounting raised portion 57 of the first magnetizing device 52. Moreover, the axes of the first detection gear 26 and the first magnetizing device 52 are aligned with each other by mounting the cylindrical portion 40 of the first detection gear 26 and the holding hole 56 of the first holding base 54.

Accordingly, in this embodiment, it is possible to magnetize the magnet 46 in a state where the relative rotation position and the axial position of the magnet 46 are aligned with those of the first magnetizing device 52. Consequently, it is possible to further decrease the deviation between the first mark portion 69 indicative of the position of the magnetic pole, and the actual magnetic pole of the magnet 46. Therefore, it is possible to more surely suppress the deviation between the actual steering angle and the absolute steering angle at the assembly operation.

Moreover, in this embodiment, the first detection gear 26 is formed so that the diameter of the cylindrical portion 40 is different from that of the second detection gear 27, and so that the shape of the mounting recessed portion 41*a* is different from that of the second detection gear 27. Furthermore, the first magnetizing device 52 has the shape corresponding to the first detection gear 26. With these, the second detection gear 27 cannot be assembled within the first magnetizing device 52. Accordingly, it is possible to suppress the mistake of the magnetizing operation in which the second detection gear 27 is installed in the first magnetizing device 52.

Besides, in the embodiment, the second detection gear 27 and the second magnetizing device (not shown) are constituted so as to correspond to the above-described relationship between the first detection gear 26 and the first magnetizing device 52. Accordingly, in the second detection gear 27 and the second magnetizing device, it is possible to obtain the same effects and operations.

Furthermore, in this embodiment, the second to fourth recessed portions 50*b* to 50*d* and 51*b* to 51*d* which may be mistaken (false-recognized) as the first and second mark portions 69 and 70 are not disposed around the first and second mark portions 69 and 70. Accordingly, when the first and second mark portions 69 and 70 are recognized by the camera, the sensor and so on, it is possible to set a recognition condition in which a portion around which the other recessed portions in the first to fourth recessed portions 50*a* to 50*d* and 51*a* to 51*d* do not exist is recognized as the first and second mark portions 69 and 70 (the first recessed portions 50*a* and 51*a*).

In a case of this recognition condition, the camera, the sensor and so on need not to measure the entire of the upper end surfaces of the rotating detection gears 26 and 27. It is possible to recognize the first and second mark portions 69 and 70 only by measuring a part of the region, as shown by two dot chain line in FIG. 2. With this, it is possible to recognize the first and second mark portions 69 and 70 without any problems even when the camera, the is sensor and so on which have the low resolving power (resolution) are used.

Moreover, in this embodiment, the annular protrusions 48 and 49 are arranged to restrict (regulate) the lifts of the magnets 46 and 47 at the insertion molding of the first and second detection gears 26 and 27. Accordingly, it is possible to suppress the detachment (the falling) of the magnets 46 and 47 from the first and second detection gears 26 and 27.

The present invention is not limited to the structure according to the above-described embodiment. The configuration may be varied as long as it is deviated from the gist of the present invention.

The position relationship between the mark portions 69 and 70 in the initial state in which the detection gears 26 and 27 are received in the detection gear supporting portions 32 and 33 is not limited to the confronting state in the embodiment. A state where the mark portions 69 and 70 are apart from each other by a largest distance may be set to a correct position relationship.

Moreover, in this embodiment, the consistency of the absolute steering angle and the actual steering angle is ensured by using the position alignment of the first and second mark portions 69 and 70, and the calibration. However, if the problem is not generated in the steering operation of the steering wheel 1, the storage circuit 66, the correction value abnormality sensing circuit 67 and so on which relate to the calibration may be omitted, and the absolute steering angle may be aligned with the actual steering angle only by the position alignment of the first and second mark portions 69 and 70.

In this case, the calculation of the correction value, the recalculation when the abnormality is generated in the correction value, and so on are not needed. Accordingly, it is possible to simplify the operation process when the steering angle sensor 16 is assembled to the vehicle.

Specifically, in a case where the steering angle sensor 16 does not includes the special microprocessor, like this embodiment, at the calculation and the recalculation of the correction value, the calculation needs to be performed in a state where the all of the electric motor 19, the ECU 19 including the microprocessor 65, and so on are assembled. That operation is complicated. It is possible to fundamentally avoid these problems.

Moreover, in the above explanations, the second detection gear 27 is directly driven and rotated by the first detection gear 26 in accordance with the engagement of the tooth portions 39 of the second detection gear 27 and the tooth portions 35 of the first detection gear 26. However, other gears may be disposed between the second detection gear 27 and the first detection gear 26, so that the second detection gear 27 is indirectly driven and rotated by the first detection gear 26.

Moreover, the first detection gear 26 is arranged to be rotated in accordance with the rotation of the steering wheel 1 by the interposition of the main gear 25. However, the main gear 25 may be omitted. Moreover, the first detection gear 26 may be mounted to the steering is shaft 6 so as to rotate as a unit with the steering wheel 1.

Furthermore, in the above-described explanations, the first and second sensed portions are the first and second mark portions which are recognized by the visual observation, and by the image recognition by the sensors such as the camera. The first and second sensed portions may be ones which cannot be recognized by the visual observation, and the image recognition as long as the first and second sensed portions represent the positions of the magnetic poles of the magnets 46 and 47 provided to the detection gears 26 and 27, and the positions of the first and second sensed portions can be sensed by a predetermined sensing device. For example, magnetic members which are other than the magnets 46 and 47 may be embedded in the first and second detection gears 26 and 27, and the magnetic sensor may sense the positions of these magnetic members.

In this case, the assembling operation of the gears 26 and 27 to the steering angle sensor 16 is performed by machine tool arranged to be driven based on position information obtained from the sensing device.

Following aspects are conceivable as the power steering apparatus according to the above-described embodiment.

The power steering apparatus according to one aspect includes: a steering mechanism arranged to steer a steered wheel in accordance with an operation of a steering wheel; an electric motor arranged to provide a steering force to the steering mechanism; a sensor housing provided to the steering mechanism, and including a first gear supporting portion and a second gear supporting portion which are formed within the sensor housing; a first gear which is rotatably held on the first gear supporting portion, which includes a plurality of first tooth portions integrally formed on an outer circumference side, and a first magnetic member in which an N pole and an S pole are magnetized around a rotation axis that is a center, and which is arranged to be rotated in accordance with a rotation of the steering wheel; a first mark portion which is provided to the first gear, and which is indicative of a position of one of the N pole and the S pole that are magnetized in the first magnetic member; a second gear which is rotatably held on the second gear supporting portion, which includes a plurality of second tooth portions integrally formed on an outer circumference side, and arranged to be directly or indirectly engaged with the first tooth portions, which includes a second magnetic member in which an N pole and an S pole are magnetized around a rotation axis that is a center, and which is arranged to be rotated in accordance with the rotation of the first gear; a second mark portion which is provided to the second gear, which is indicative of a position of one of the N pole and the S pole that are magnetized in the second magnetic member, and which is in a predetermined position relationship with the first mark portion in an initial state where the first gear and the second gear are received on the gear supporting portions; a first detection element arranged to sense a rotation angle of the first gear based on a variation of a magnetic field generated by the first magnetic member; a second detection element arranged to sense a rotation angle of the second gear based on a variation of a magnetic field generated by the second magnetic member; an absolute steering angle calculating circuit configured to calculate an absolute steering angle of the steering wheel from an neutral position of the steering wheel at which the steered wheel directs in a straight direction, by a combination between the rotation angle of the first gear and the rotation angle of the second gear; and a control section configured to drive and control the electric motor based on the absolute steering angle.

In a preferable aspect of the power steering apparatus, the control section includes a microprocessor; and the absolute steering angle calculating circuit is provided within the microprocessor.

In another preferable aspect, in one of the aspects of the power steering apparatus, each of the first gear and the second gear is formed by an insertion molding by performing an injection molding in a state where one of the magnetic member of the first gear and the magnetic member of the second gear is disposed within a cavity of a die; the first magnetic member is magnetized after the insertion molding by the magnetic field generated in an axial direction of the first gear; and the second magnetic member is magnetized after the insertion molding by the magnetic field generated in an axial direction of the second gear.

In still another preferable aspect, in one of the aspects of the power steering apparatus, the first magnetic member has a sectional shape which is perpendicular to the axial direction of the first gear, and which is a noncircular shape; and the second magnetic member has a sectional shape which is perpendicular to the axial direction of the second gear, and which is a noncircular shape.

In still another preferable aspect, in one of the aspects of the power steering apparatus, the first mark portion is provided radially inside a tooth bottom of a tooth which is nearest to the first mark portion in the plurality of the first tooth portions; and the second mark portion is provided radially inside a tooth bottom of a tooth which is nearest to the second mark portion in the plurality of the second tooth portions.

In still another preferable aspect, in one of the aspects of the power steering apparatus, the sensor housing includes a first confronting surface provided to confront the first gear in the axial direction of the first gear, a first protruding portion provided to the first confronting surface, and formed to protrude toward the first gear side, a second confronting surface provided to confront the second gear in the axial direction of the second gear, and a second protruding portion provided to the second confronting surface, and formed to protrude toward the second gear side; the first protruding portion is formed at a position between the plurality of the first tooth portions and the first mark in a radial direction of the first gear; and the second protruding portion is formed at a position between the plurality of the second tooth portions and the second mark in a radial direction of the second gear.

In still another preferable aspect, in one of the aspects of the power steering apparatus, the first mark portion is recessed to be opened in an axial direction of the first gear; and the second mark portion is recessed to be opened in an axial direction of the second gear.

In still another preferable aspect, in one of the aspects of the power steering apparatus, each of the first gear and the second gear is formed by an insertion molding by performing an injection molding in a state where one of the magnetic member of the first gear and the magnetic member of the second gear is disposed within a cavity of a die; the first magnetic member is held within the cavity in a state where an outer circumference surface is sandwiched by claw portions of a device for an insertion molding; the first mark portion is formed by pulling out the claw portions of the device for the insertion molding from the first gear after the insertion molding; the second magnetic member is held within the cavity in a state where an outer circumference surface is sandwiched by the claw portions of the device for the insertion molding; and the second mark portion is formed by pulling out the claw portions of the device for the insertion molding from the second gear after the insertion molding.

In still another preferable aspect of the power steering apparatus, the first mark portion has a depth in the axial direction of the first gear, and the depth of the first mark portion is greater than an axial width of the outer circumference surface of the first magnetic member; and the second mark portion has a depth in the axial direction of the second gear, and the depth of the second mark portion is greater than an axial width of the outer is circumference surface of the second magnetic member.

In still another preferable aspect, in one of the aspects of the power steering apparatus, the first gear includes the first mark portion positioned on one axial side, and a first rotation position aligning portion positioned on the other axial side, and arranged to align a relative rotation position with a device for magnetizing the first magnetic member; and the second gear includes the second mark portion positioned on one axial side, and a second rotation position aligning portion positioned on the other axial side, and arranged to align a relative rotation with a device for magnetizing the second magnetic member.

In still another preferable aspect, in one of the aspects of the power steering apparatus, one of the first gear and the second gear has a diameter smaller than the other of the first gear and the second gear; and one of the first rotation position aligning portion and the second rotation position aligning portion is formed so that the one of the first gear and the second gear cannot be installed in the device for magnetizing the magnetic member of the other of the first gear and the second gear.

In still another preferable aspect, in one of the aspects of the power steering apparatus, the first gear includes a first cylindrical portion formed around a rotation axis of the first gear that is a center; the first magnetic member is magnetized in a state where the first cylindrical portion is inserted into a recessed portion of a magnetizing device which is formed to be engaged with the first cylindrical portion; the second gear includes a second cylindrical portion formed around a rotation axis of the second gear that is a center; and the second magnetic member is magnetized in a state where the second cylindrical portion is inserted into a recessed portion of a magnetizing device which is formed to be engaged with the second cylindrical portion.

In still another preferable aspect, in one of the aspects of the power steering apparatus, in the first gear, the only first mark portion is formed as a mark, in a predetermined circumferential region including the first mark portion; and in the second gear, the only second mark portion is formed as a mark in a predetermined circumferential region including the second mark portion.

In still another preferable aspect, in one of the aspects of the power steering apparatus, the power steering apparatus includes a third gear provided to the sensor housing; the steering mechanism includes a steering shaft arranged to be rotated in accordance with the rotation of the steering wheel; the third gear includes an insertion hole which is formed within the third gear, and through which the steering shaft is inserted, a plurality of third tooth portions provided on an outer circumference side, and arranged to be engaged with the plurality of the first tooth portions, and thereby to transmit the rotation of the steering wheel to the first gear, and a third mark portion provided at a predetermined position in a circumferential direction; the first gear, the second gear, and the third gear are assembled so that the first mark portion, the second mark portion, and the third mark portion are in a predetermined position relationship.

A power steering apparatus according to a different aspect includes: a steering mechanism arranged to steer a steered wheel in accordance with an operation of a steering wheel; an electric motor arranged to provide a steering force to the steering mechanism; a sensor housing provided to the steering mechanism, and including a first gear supporting portion and a second gear supporting portion which are formed within the sensor housing; a first gear which is rotatably held on the first gear supporting portion, which includes a plurality of first tooth portions integrally formed on an outer circumference side, and a first magnetic member in which an N pole and an S pole are magnetized around a rotation axis that is a center, and which is arranged to be rotated in accordance with a rotation of the steering wheel; a first sensed portion which is provided to the first gear, and which is arranged to sense a position of one of the N pole and the S pole that are magnetized in the first magnetic member, by a sensing device; a second gear which is rotatably held on the second gear supporting portion, which includes a plurality of second tooth portions integrally formed on an outer circumference side, and arranged to be directly or indirectly engaged with the first tooth portions, which includes a second magnetic member in which an N pole and an S pole are magnetized around a rotation axis that is a center, and which is arranged to be rotated in accordance with the rotation of the first gear; a second mark portion which is provided to the second gear, which is arranged to sense a position of one of the N pole and the S pole that are magnetized in the second magnetic member, by a sensing device, and which is in a predetermined position relationship with the first sensed portion in an initial state where the first gear and the second gear are received on the gear supporting portions; a first detection element arranged to sense a rotation angle of the first gear based on a variation of a magnetic field generated by the first magnetic member; a second detection element arranged to sense a rotation angle of the second gear based on a variation of a magnetic field generated by the second magnetic member; an absolute steering angle calculating circuit configured to calculate an absolute steering angle of the steering wheel from an neutral position of the steering wheel at which the steered wheel directs in a straight direction, by a combination between the rotation angle of the first gear and the rotation angle of the second gear; and a control section configured to drive and control the electric motor based on the absolute steering angle.

A power steering apparatus according to a different aspect includes a steering mechanism arranged to steer a steered wheel in accordance with an operation of a steering wheel; an electric motor arranged to provide a steering force to the steering mechanism; a sensor housing provided to the steering mechanism, and including a first gear supporting portion and a second gear supporting portion which are formed within the sensor housing; a first gear which is rotatably held on the first gear supporting portion, which includes a plurality of first tooth portions integrally formed on an outer circumference side, and a first magnetic member in which an N pole and an S pole are magnetized around a rotation axis that is a center, and which is arranged to be rotated in accordance with a rotation of the steering wheel; a second gear which is rotatably held on the second gear supporting portion, which includes a plurality of second tooth portions integrally formed on an outer circumference side, and arranged to be directly or indirectly engaged with the first tooth portions, which includes a second magnetic member in which an N pole and an S pole are magnetized around a rotation axis that is a center, and which is arranged to be rotated in accordance with the rotation of the first gear; a first detection element arranged to sense a rotation angle of the first gear based on a variation of a magnetic field generated by the first magnetic member; a second detection element arranged to sense a rotation angle of the second gear based on a variation of a magnetic field generated by the second magnetic member; a storage circuit configured to store a correction value for correcting an output of the first detection element or an output of the second detection element; a correction value abnormality sensing circuit configured to sense an abnormality of the correction value; and an absolute steering angle calculating circuit configured to calculate an absolute steering angle of the steering wheel from an neutral position of the steering wheel at which the steered wheel directs in a straight direction, based on the output of the first detection element, the output of the second detection element, and the correction value when the abnormality of the correction value is not sensed, the first gear and the second gear being disposed, respectively, on the gear supporting portions so that a direction of a magnetic pole of the first magnetic member and a direction of a magnetic pole of the second magnetic member are in a predetermined position relationship, and the absolute steering angle calculating circuit being configured to calculate the absolute steering angle based on the output of the first detection element and the output of the second detection element when the correction value abnormality sensing circuit senses the abnormality.

In a preferable aspect of the power steering apparatus, the first gear includes a first mark portion indicative of one of an N pole and an S pole magnetized in the first magnetic member; and the second gear includes a second mark portion indicative of one of an N pole and an S pole magnetized in the second magnetic member.

In still another preferable aspect, in one of the aspects of the power steering apparatus, the control section includes a microprocessor; and the absolute steering angle calculating circuit is provided within the microprocessor.

In still another preferable aspect, in one of the aspects of the power steering apparatus, each of the first gear and the second gear is formed by an insertion molding by performing an injection molding in a state where one of the magnetic member of the first gear and the magnetic member of the second gear is disposed within a cavity of a die; the first magnetic member is magnetized after the insertion molding by the magnetic field generated in an axial direction of the first gear; and the second magnetic member is magnetized after the insertion molding by the magnetic field generated in an axial direction of the second gear.

In still another preferable aspect, in one of the aspects of the power steering apparatus, the first mark portion is provided radially inside a tooth bottom of a tooth which is nearest to the first mark portion in the plurality of the first tooth portions; and the second mark portion is provided radially inside a tooth bottom of a tooth which is nearest to the second mark portion in the plurality of the second tooth portions.

The invention claimed is:

1. A power steering apparatus comprising:
   a steering mechanism arranged to steer a steered wheel in accordance with an operation of a steering wheel;
   an electric motor arranged to provide a steering force to the steering mechanism;
   a sensor housing provided to the steering mechanism, and including a first gear supporting portion and a second gear supporting portion which are formed within the sensor housing;
   a first gear which is rotatably held on the first gear supporting portion, which includes a plurality of first tooth portions integrally formed on an outer circumference side, and a first magnetic member in which an N pole and an S pole are magnetized around a rotation axis that is a center, and which is arranged to be rotated in accordance with a rotation of the steering wheel;
   a first mark portion which is provided to the first gear, and which is indicative of a position of one of the N pole and the S pole that are magnetized in the first magnetic member;
   a second gear which is rotatably held on the second gear supporting portion, which includes a plurality of second tooth portions integrally formed on an outer circumference side, and arranged to be directly or indirectly engaged with the first tooth portions, which includes a second magnetic member in which an N pole and an S pole are magnetized around a rotation axis that is a center, and which is arranged to be rotated in accordance with the rotation of the first gear;
   a second mark portion which is provided to the second gear, which is indicative of a position of one of the N pole and the S pole that are magnetized in the second magnetic member, and which is in a predetermined position relationship with the first mark portion in an initial state where the first gear and the second gear are received on the gear supporting portions;
   a first detector arranged to sense a rotation angle of the first gear based on a variation of a magnetic field generated by the first magnetic member;
   a second detector arranged to sense a rotation angle of the second gear based on a variation of a magnetic field generated by the second magnetic member;
   an absolute steering angle calculating circuit configured to calculate an absolute steering angle of the steering wheel from an neutral position of the steering wheel at which the steered wheel directs in a straight direction, by a combination between the rotation angle of the first gear and the rotation angle of the second gear; and
   a control section configured to drive and control the electric motor based on the absolute steering angle.

2. The power steering apparatus as claimed in claim 1, wherein the control section includes a microprocessor; and the absolute steering angle calculating circuit is provided within the microprocessor.

3. The power steering apparatus as claimed in claim 1, wherein each of the first gear and the second gear is formed by an insertion molding by performing an injection molding in a state where one of the magnetic member of the first gear and the magnetic member of the second gear is disposed within a cavity of a die;
the first magnetic member is magnetized after the insertion molding by the magnetic field generated in an axial direction of the first gear; and
the second magnetic member is magnetized after the insertion molding by the magnetic field generated in an axial direction of the second gear.

4. The power steering apparatus as claimed in claim 3, wherein the first magnetic member has a sectional shape which is perpendicular to the axial direction of the first gear, and which is a noncircular shape; and
the second magnetic member has a sectional shape which is perpendicular to the axial direction of the second gear, and which is a noncircular shape.

5. The power steering apparatus as claimed in claim 1, wherein the first mark portion is provided radially inside a tooth bottom of a tooth which is nearest to the first mark portion in the plurality of the first tooth portions; and
the second mark portion is provided radially inside a tooth bottom of a tooth which is nearest to the second mark portion in the plurality of the second tooth portions.

6. The power steering apparatus as claimed in claim 5, wherein the sensor housing includes a first confronting surface provided to confront the first gear in the axial direction of the first gear, a first protruding portion provided to the first confronting surface, and formed to protrude toward the first gear side, a second confronting surface provided to confront the second gear in the axial direction of the second gear, and a second protruding portion provided to the second confronting surface, and formed to protrude toward the second gear side;
the first protruding portion is formed at a position between the plurality of the first tooth portions and the first mark in a radial direction of the first gear; and
the second protruding portion is formed at a position between the plurality of the second tooth portions and the second mark in a radial direction of the second gear.

7. The power steering apparatus as claimed in claim 1, wherein the first mark portion is recessed to be opened in an axial direction of the first gear; and
the second mark portion is recessed to be opened in an axial direction of the second gear.

8. The power steering apparatus as claimed in claim 7, wherein each of the first gear and the second gear is formed by an insertion molding by performing an injection molding in a state where one of the magnetic member of the first gear and the magnetic member of the second gear is disposed within a cavity of a die;
the first magnetic member is held within the cavity in a state where an outer circumference surface is sandwiched by claw portions of a device for an insertion molding;
the first mark portion is formed by pulling out the claw portions of the device for the insertion molding from the first gear after the insertion molding;
the second magnetic member is held within the cavity in a state where an outer circumference surface is sandwiched by the claw portions of the device for the insertion molding; and
the second mark portion is formed by pulling out the claw portions of the device for the insertion molding from the second gear after the insertion molding.

9. The power steering apparatus as claimed in claim 8, wherein the first mark portion has a depth in the axial direction of the first gear, and the depth of the first mark portion is greater than an axial width of the outer circumference surface of the first magnetic member; and
the second mark portion has a depth in the axial direction of the second gear, and the depth of the second mark portion is greater than an axial width of the outer circumference surface of the second magnetic member.

10. The power steering apparatus as claimed in claim 1, wherein the first gear includes the first mark portion positioned on one axial side, and a first rotation position aligning portion positioned on the other axial side, and arranged to align a relative rotation position with a device for magnetizing the first magnetic member; and
the second gear incudes the second mark portion positioned on one axial side, and a second rotation position aligning portion positioned on the other axial side, and arranged to align a relative rotation with a device for magnetizing the second magnetic member.

11. The power steering apparatus as claimed in claim 10, wherein one of the first gear and the second gear has a diameter smaller than the other of the first gear and the second gear; and one of the first rotation position aligning portion and the second rotation position aligning portion is formed so that the one of the first gear and the second gear cannot be installed in the device for magnetizing the magnetic member of the other of the first gear and the second gear.

12. The power steering apparatus as claimed in claim 10, wherein the first gear includes a first cylindrical portion formed around a rotation axis of the first gear that is a center;
the first magnetic member is magnetized in a state where the first cylindrical portion is inserted into a recessed portion of a magnetizing device which is formed to be engaged with the first cylindrical portion;
the second gear includes a second cylindrical portion formed around a rotation axis of the second gear that is a center; and
the second magnetic member is magnetized in a state where the second cylindrical portion is inserted into a recessed portion of a magnetizing device which is formed to be engaged with the second cylindrical portion.

13. The power steering apparatus as claimed in claim 1, wherein in the first gear, the only first mark portion is formed as a mark, in a predetermined circumferential region including the first mark portion; and
in the second gear, the only second mark portion is formed as a mark in a predetermined circumferential region including the second mark portion.

14. The power steering apparatus as claimed in claim 1, wherein the power steering apparatus includes a third gear provided to the sensor housing;
the steering mechanism includes a steering shaft arranged to be rotated in accordance with the rotation of the steering wheel;
the third gear includes an insertion hole which is formed within the third gear, and through which the steering shaft is inserted, a plurality of third tooth portions provided on an outer circumference side, and arranged to be engaged with the plurality of the first tooth portions, and thereby to transmit the rotation of the steering wheel to the first gear, and a third mark portion provided at a predetermined position in a circumferential direction;

the first gear, the second gear, and the third gear are assembled so that the first mark portion, the second mark portion, and the third mark portion are in a predetermined position relationship.

15. A power steering apparatus comprising:
a steering mechanism arranged to steer a steered wheel in accordance with an operation of a steering wheel;
an electric motor arranged to provide a steering force to the steering mechanism;
a sensor housing provided to the steering mechanism, and including a first gear supporting portion and a second gear supporting portion which are formed within the sensor housing;
a first gear which is rotatably held on the first gear supporting portion, which includes a plurality of first tooth portions integrally formed on an outer circumference side, and a first magnetic member in which an N pole and an S pole are magnetized around a rotation axis that is a center, and which is arranged to be rotated in accordance with a rotation of the steering wheel;
a first sensed portion which is provided to the first gear, and which is arranged to permit sensing of a position of one of the N pole and the S pole that are magnetized in the first magnetic member, by a sensing device;
a second gear which is rotatably held on the second gear supporting portion, which includes a plurality of second tooth portions integrally formed on an outer circumference side, and arranged to be directly or indirectly engaged with the first tooth portions, which includes a second magnetic member in which an N pole and an S pole are magnetized around a rotation axis that is a center, and which is arranged to be rotated in accordance with the rotation of the first gear;
a second sensed portion which is provided to the second gear, which is arranged to permit sensing of a position of one of the N pole and the S pole that are magnetized in the second magnetic member, by a sensing device, and which is in a predetermined position relationship with the first sensed portion in an initial state where the first gear and the second gear are received on the gear supporting portions;
a first detector arranged to sense a rotation angle of the first gear based on a variation of a magnetic field generated by the first magnetic member;
a second detector arranged to sense a rotation angle of the second gear based on a variation of a magnetic field generated by the second magnetic member;
an absolute steering angle calculating circuit configured to calculate an absolute steering angle of the steering wheel from an neutral position of the steering wheel at which the steered wheel directs in a straight direction, by a combination between the rotation angle of the first gear and the rotation angle of the second gear; and
a control section configured to drive and control the electric motor based on the absolute steering angle.

16. A power steering apparatus comprising:
a steering mechanism arranged to steer a steered wheel in accordance with an operation of a steering wheel;
an electric motor arranged to provide a steering force to the steering mechanism;
a sensor housing provided to the steering mechanism, and including a first gear supporting portion and a second gear supporting portion which are formed within the sensor housing;
a first gear which is rotatably held on the first gear supporting portion, which includes a plurality of first tooth portions integrally formed on an outer circumference side, and a first magnetic member in which an N pole and an S pole are magnetized around a rotation axis that is a center, and which is arranged to be rotated in accordance with a rotation of the steering wheel;
a second gear which is rotatably held on the second gear supporting portion, which includes a plurality of second tooth portions integrally formed on an outer circumference side, and arranged to be directly or indirectly engaged with the first tooth portions, which includes a second magnetic member in which an N pole and an S pole are magnetized around a rotation axis that is a center, and which is arranged to be rotated in accordance with the rotation of the first gear;
a first detector arranged to sense a rotation angle of the first gear based on a variation of a magnetic field generated by the first magnetic member;
a second detector arranged to sense a rotation angle of the second gear based on a variation of a magnetic field generated by the second magnetic member;
a storage circuit configured to store a correction value for correcting an output of the first detector or an output of the second detector;
a correction value abnormality sensing circuit configured to sense an abnormality of the correction value; and
an absolute steering angle calculating circuit configured to calculate an absolute steering angle of the steering wheel from an neutral position of the steering wheel at which the steered wheel directs in a straight direction, based on the output of the first detector, the output of the second detector, and the correction value when the abnormality of the correction value is not sensed,
the first gear and the second gear being disposed, respectively, on the gear supporting portions so that a direction of a magnetic pole of the first magnetic member and a direction of a magnetic pole of the second magnetic member are in a predetermined position relationship, and
the absolute steering angle calculating circuit being configured to calculate the absolute steering angle based on the output of the first detector and the output of the second detector when the correction value abnormality sensing circuit senses the abnormality.

17. The power steering apparatus as claimed in claim 16, wherein the first gear includes a first mark portion indicative of one of an N pole and an S pole magnetized in the first magnetic member; and
the second gear includes a second mark portion indicative of one of an N pole and an S pole magnetized in the second magnetic member.

18. The power steering apparatus as claimed in claim 17, wherein the control section includes a microprocessor; and the absolute steering angle calculating circuit is provided within the microprocessor.

19. The power steering apparatus as claimed in claim 17, wherein the first mark portion is provided radially inside a tooth bottom of a tooth which is nearest to the first mark portion in the plurality of the first tooth portions; and
the second mark portion is provided radially inside a tooth bottom of a tooth which is nearest to the second mark portion in the plurality of the second tooth portions.

20. The power steering apparatus as claimed in claim 16, wherein each of the first gear and the second gear is formed by an insertion molding by performing an injection molding in a state where one of the magnetic member of the first gear and the magnetic member of the second gear is disposed within a cavity of a die;
- the first magnetic member is magnetized after the insertion molding by the magnetic field generated in an axial direction of the first gear; and
- the second magnetic member is magnetized after the insertion molding by the magnetic field generated in an axial direction of the second gear.

* * * * *